(12) United States Patent
Seok et al.

(10) Patent No.: US 9,577,744 B2
(45) Date of Patent: Feb. 21, 2017

(54) METHOD FOR TRANSMITTING AND RECEIVING A FRAME IN A WIRELESS LAN SYSTEM, AND APPARATUS FOR SUPPORTING THE METHOD

(71) Applicant: LG ELECTRONICS INC., Seoul (KR)

(72) Inventors: Yong Ho Seok, Anyang-si (KR); Hyang Sun You, Anyang-si (KR); Jong Hyun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/239,740

(22) PCT Filed: Dec. 10, 2012

(86) PCT No.: PCT/KR2012/010699
§ 371 (c)(1),
(2) Date: Feb. 19, 2014

(87) PCT Pub. No.: WO2013/085365
PCT Pub. Date: Jun. 13, 2013

(65) Prior Publication Data
US 2014/0286226 A1  Sep. 25, 2014

Related U.S. Application Data

(60) Provisional application No. 61/583,595, filed on Jan. 5, 2012, provisional application No. 61/568,651, filed on Dec. 9, 2011.

(51) Int. Cl.
*H04W 4/06* (2009.01)
*H04B 7/26* (2006.01)
*H04W 56/00* (2009.01)

(52) U.S. Cl.
CPC ............ *H04B 7/2612* (2013.01); *H04W 4/06* (2013.01); *H04W 56/00* (2013.01)

(58) Field of Classification Search
CPC ...................................................... H04W 4/06
(Continued)

(56) References Cited

U.S. PATENT DOCUMENTS 6,690,947 B1 *  2/2004  Tom ................. H04M 1/72525
                                                    455/418
2005/0165950 A1 *  7/2005  Takagi ................. H04L 12/413
                                                    709/236
(Continued)

FOREIGN PATENT DOCUMENTS

KR    10-2009-0026184 A    3/2009
KR       1020090032624 A   4/2009
(Continued)

OTHER PUBLICATIONS

Compressed MAC PDU Overhead (IEEE C802.16maint-08/011).

*Primary Examiner* — Dang Ton
*Assistant Examiner* — Pamit Kaur
(74) *Attorney, Agent, or Firm* — Dentons US LLP

(57) ABSTRACT

Provided is a method for receiving a frame, which is to be performed by a station (STA) in a wireless LAN system. The method includes receiving a multicast frame from an access point (AP). The multicast frame includes a medium access control (MAC) header. The MAC header includes a transmitter address (TA) field and a receiver address (RA) field. The RA field includes a multicast association identifier for identifying an STA group including said STA.

8 Claims, 20 Drawing Sheets

(58) Field of Classification Search
USPC .................................... 370/312, 390, 392
See application file for complete search history.

(56) References Cited

U.S. PATENT DOCUMENTS

| | | | |
|---|---|---|---|
| 2006/0092871 A1* | 5/2006 | Nishibayashi | H04L 1/1671 370/328 |
| 2007/0201468 A1* | 8/2007 | Jokela | 370/390 |
| 2010/0189021 A1* | 7/2010 | He et al. | 370/311 |
| 2010/0208696 A1* | 8/2010 | Lee | H04W 36/0055 370/331 |
| 2011/0069652 A1* | 3/2011 | Kakani | H04L 12/185 370/312 |
| 2013/0022032 A1 | 1/2013 | Nasrabadi et al. | |
| 2013/0142095 A1 | 6/2013 | Calcev et al. | |

FOREIGN PATENT DOCUMENTS

| | | |
|---|---|---|
| KR | 10-2011-0018895 A | 2/2011 |
| KR | 10-2011-0043497 | 4/2011 |
| KR | 10-2011-0058713 A | 6/2011 |
| KR | 10-2011-0095098 A | 8/2011 |

* cited by examiner

FIG. 6

| Protocol version | Type | Subtype | To DS | From DS | More fragment | Retry | Power management | More data | Protected frame | Order |
|---|---|---|---|---|---|---|---|---|---|---|
| 2 | 2 | 4 | 1 | 1 | 1 | 1 | 1 | 1 | 1 | 1 |
| 605 | 610 | 615 | 620 | 625 | 630 | 635 | 640 | 645 | 650 | 655 |

Bits :

METHOD FOR TRANSMITTING AND RECEIVING A FRAME IN A WIRELESS LAN SYSTEM, AND APPARATUS FOR SUPPORTING THE METHOD

This application is a 35 USC §371 National Stage entry of International Application No. PCT/KR2012/010699, filed Dec. 10, 2012, and claims priority to U.S. Provisional Application No. 61/568,651, filed Dec. 9, 2011 and 61/583,595 filed Jan. 5, 2012, each of which are hereby incorporated by reference in its entirety.

BACKGROUND OF THE INVENTION

Field of the Invention

The present invention concerns wireless communications, and more specifically, to methods of transmitting and receiving frames in a Wireless Local Area Network system and apparatuses supporting the same.

Related Art

With the growth of information communication technology, various wireless communication technologies have been recently developed. Among others, Wireless Local Area Network (WLAN) is a technology that allows for wireless access to the Internet at home or business or in a specific service area using a handheld terminal such as a personal digital assistant (PDA), a laptop computer, a portable multimedia player (PMP), etc.

In contrast to the existing WLAN systems supporting High Throughput (HT) and Very High Throughput (VHT) using bandwidths of 20/40/80/160/80+80 MHz in a 2 GH and/or 5 GHz band, a WLAN system is offered that may be operated in a sub 1 GHz. When operated in a sub 1 GHz, a WLAN system uses a considerably narrow bandwidth channel as compared with the existing WLAN systems. Accordingly, service coverage may be expanded further than the existing systems do.

Due to the nature of the physical layer in a next-generation WLAN system, the efficiency of data transmission and reception may be deteriorated. Thus, a need exists for a frame format that allows data transmission and reception to be done efficiently in a next-generation WLAN system and a frame transmission and reception method based on the frame.

SUMMARY OF THE INVENTION

An object of the present invention is to provide a method of transmitting and receiving a frame in a Wireless Local Area Network (WLAN) system and an apparatus supporting the method.

In an aspect, a method of receiving a frame by a station (STA) in a WLAN system is provided. The method includes receiving a multicast frame from an access point (AP). The multicast frame includes a Medium Access Control (MAC) header. The MAC header includes a transmitter address (TA) field and a receiver address (RA) field. The RA field includes a multicast association identifier identifying a STA group including the STA.

The target multicast association identifier may be generated in basis of a multicast address identifying the STA group.

The multicast address may have a format of a MAC address. The multicast association identifier may be configured as a format of an association identifier assigned to the STA when the STA is associated with the AP.

The method may further include receiving a multicast association identifier response frame including the multicast association identifier from the AP.

The method may further include transmitting a multicast association identifier request frame to the AP. The multicast association identifier request frame may include a target multicast address field. The target multicast address field may include the multicast address is requested to be mapped to the multicast association identifier by the STA.

The multicast association identifier response frame may be transmitted in response to the multicast association identifier request frame.

The multicast association identifier response frame may include a target multicast address field and an association identifier field. The target multicast address field may include the multicast address. The association identifier field may include the multicast association identifier.

In another aspect, a wireless apparatus operating in a WLAN system is provided. The wireless apparatus includes a transceiver transmitting and receiving radio signals and a processor operably coupled to the transceiver. The processor is configured to receive a multicast frame from an access point (AP). The multicast frame includes a Medium Access Control (MAC) header. The MAC header includes a transmitter address (TA) field and a receiver address (RA) field. The RA field includes a multicast association identifier identifying a wireless apparatus group including the wireless apparatus.

Medium Access Control (MAC) header compression enables the length of a bit sequence included in the MAC header to be reduced. Accordingly, the size of the bit sequence that is actually transmitted by the access point and/or station so as to send data may be reduced. This may lead to a reduction in the time consumed for processing a specific length of unit data, thereby resulting in the overall data throughput of the WLAN system.

BRIEF DESCRIPTION OF THE DRAWINGS

FIG. 6 is a block diagram illustrating an example frame control field format of an MAC frame.

DESCRIPTION OF EXEMPLARY EMBODIMENTS

Figure 1:
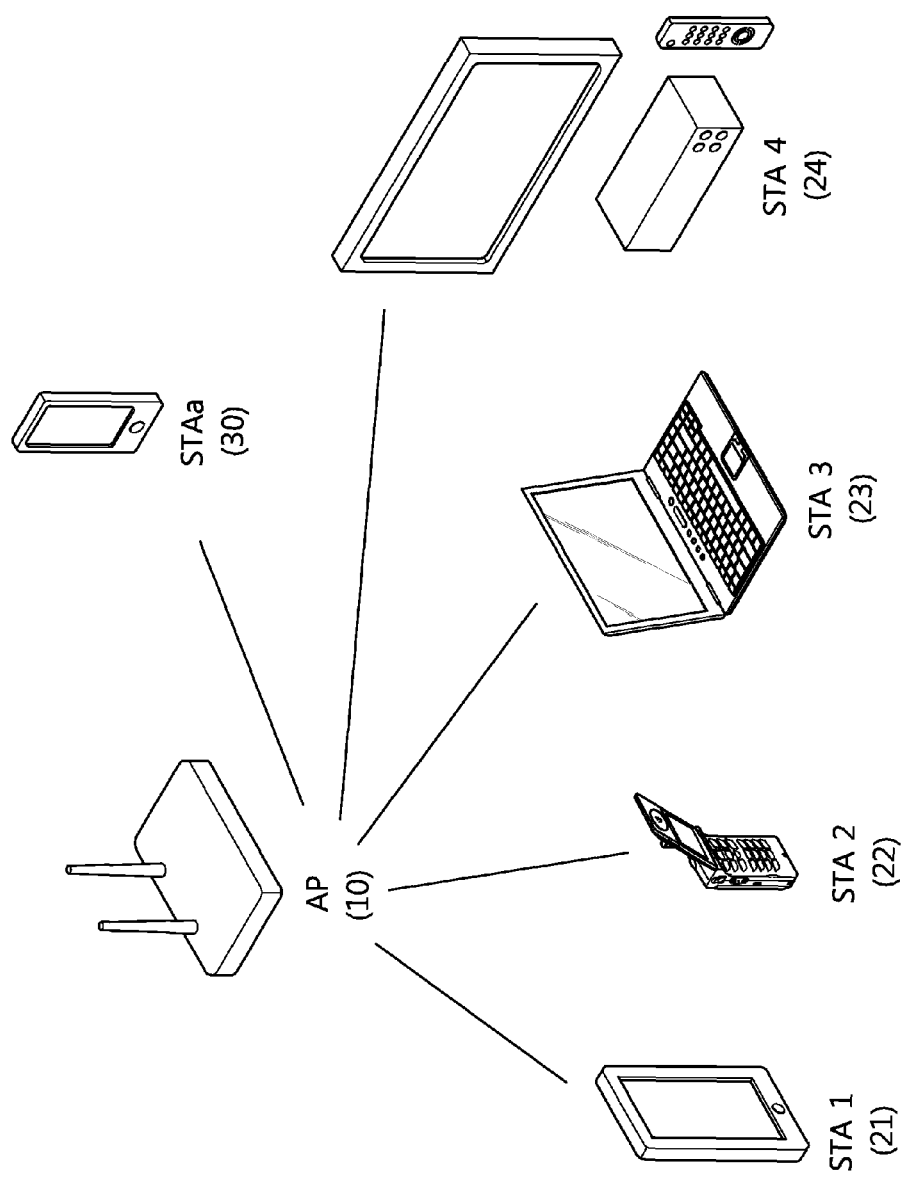
FIG. 1 is a view illustrating the configuration of a general Wireless Local Area Network (WLAN) system to which an embodiment of the present invention may apply.

FIG. 1 is a view illustrating the configuration of a general Wireless Local Area Network (WLAN) system to which an embodiment of the present invention may apply.

Referring to FIG. 1, the WLAN system includes one or more basic service sets (BSSs). A BSS is a set of stations (STAs) that may be successfully synchronized with each other and may communicate with each other, and is not a concept indicating a specific area.

An infrastructure BSS includes one or more non-Access Point (AP) stations (non-AP STA1(21), non-AP STA2(22), non-AP STA3(23), non-AP STA4(24), and non-AP STAa (30)), an AP 10 providing a distribution service, and a distribution system (DS) linking multiple APs. In the infrastructure BSS, the AP manages the non-AP STAs of the BSS.

In contrast, an independent BSS (IBSS) is a BSS operating in an ad-hoc mode. The IBSS does not include an AP and thus lacks a centralized management entity. That is, in the IBSS, non-AP STAs are managed in a distributed manner. In the IBSS, all the STAs may be mobile STAs, and due to no permission to access the DS, constitute a self-contained network.

The STA is any functional entity that includes a medium access control (MAC) and a physical layer interface for a radio medium that follow the Institute of Electrical and Electronics Engineers (IEEE) 802.11 standards and in broader concept includes an AP and a non-AP station.

A non-AP STA is a STA that is not an AP, and may also be referred to as a mobile terminal, wireless device, wireless transmit/receive unit (WTRU), user equipment (UE), mobile station (MS), mobile subscriber unit or simply user. Hereinafter, for ease of description, the non-AP STA is denoted STA.

The AP is a functional entity that provides access to a DS via a radio medium for a STA associated with an AP. In an infrastructure BSS including an AP, communication between STAs is in principle achieved via an AP, but in case a direct link is set up, the STAs may perform direct communication between each other. The AP may also be referred to as a central controller, base station (BS), node-B, BTS (Base Transceiver System), site controller, or managing STA.

A plurality of BSSs including the BSS shown in FIG. 1 may be connected to each other via a distribution system (DS). The plurality of BSSs linked with each other through a DS is referred to as an extended service set (ESS). The APs and/or STAs included in the ESS may communicate with each other, and in the same ESS, STAs may travel from one BSS to another BSS while maintaining seamless communication.

In the WLAN system according to IEEE 802.11, the basic access mechanism of Medium Access Control (MAC) is a Carrier Sense Multiple Access with Collision Avoidance (CSMA/CS) mechanism. The CSMA/CS mechanism is also referred to as Distributed Coordination Function (DCF) of IEEE 802.11 MAC, and basically, it adopts a "listen before talk" access mechanism. Following such type of access mechanism, an AP and/or STA senses a radio channel or medium prior to transmission. If as a result of the sensing, the medium is determined to be in idle state, frame transmission is initiated through the medium. On the contrary, if the medium is sensed to be in occupied state, the AP and/or STA sets a deferred time for medium access and waits without starting its own transmission.

The CSMA/CS mechanism includes virtual carrier sensing in addition to physical carrier sensing in which an AP and/or STA directly senses a medium. The virtual carrier sensing is to make up for a problem that may occur in connection with medium access, such as hidden node problem. In order for virtual carrier sensing, the MAC of the WLAN system makes use of a network allocation vector (NAV). The NAV is a value by which an AP and/or STA currently using a medium or having authority to use the medium informs other AP and/or STA of a time remaining until the medium turns available. Accordingly, the value set by the NAV corresponds to a period during which the use of the medium is scheduled by the AP and/or STA transmitting a frame.

The IEEE 802.11 MAC protocol, together with a DCF, offers a Hybrid Coordination Function (HCF) that is based on a Point Coordination Function (PCF) that periodically performs polling so that all receiving APs and/or STAs may receive data packets in polling-based synchronized access scheme with the DCF. The HCF has an Enhanced Distributed Channel Access (EDCA) that has a contention-based access scheme for providing data packets to multiple users and HCCA (HCF Controlled Channel Access) that uses contention free-based channel access scheme using a polling mechanism. The HCF includes a medium access mechanism for enhancing Quality of Service (QoS) of WLAN and may transmit QoS data in both a contention period (CP) and contention free period (CFP).

In the wireless communication system, a STA cannot be immediately aware of the existence of a network due to the characteristics of the radio medium when a STA powers on and starts operating. Accordingly, in order to access a network, a STA, whatever type it is, should go through a network discovery process. When discovering a network through the network discovery process, the STA selects a network to subscribe to through a network selection process. Thereafter, the STA subscribes to the selected network and performs data exchange at a transmission end/reception end.

In the WLAN system, the network discovery process is implemented as a scanning procedure. The scanning procedure is separated into passive scanning and active scanning.

The passive scanning is achieved based on a beacon frame that is periodically broadcast by an AP. In general, an AP in the WLAN system broadcasts a beacon frame at a specific interval (for example, 100 msec). The beacon frame includes information on a BSS managed by it. The STA passively awaits reception of the beacon frame at a specific channel. When obtaining the information on the network by receiving the beacon frame, the STA terminates the scanning procedure at the specific channel. The STA need not transmit a separate frame in achieving passive scanning, and the passive scanning is rather done once the beacon frame is received. Accordingly, the passive scanning may reduce the overall overhead. However, it suffers from a scanning time that is increased in proportion to the transmission period of the beacon frame.

The active scanning is that the STA actively broadcasts a probe request frame at a specific channel to request that all the APs to receive the probe request frame send network information to the STA. When receiving the probe request frame, an AP waits for a random time so as to prevent frame collision, and then includes network information in a probe response frame, then transmits the probe response frame to the STA. The STA receives the probe response frame to thereby obtain the network information, and the scanning procedure is then ended. The active scanning may get scanning done relatively quickly, but may increase the overall network overhead due to the need of a frame sequence that comes from request-response.

When finishing the scanning procedure, the STA selects a network per a specific standard on itself and then performs an authentication procedure alongside the AP. The authentication procedure is achieved in 2-way handshake. When completing the authentication procedure, the STA proceeds with an association procedure together with the AP.

The association procedure is performed in two-way handshake. First, the STA sends an association request frame to the AP. The association request frame includes information on the STA's capabilities. Based on the information, the AP determines whether to allow association with the STA. When determining whether to allow association, the AP transmits an association response frame to the STA. The association response frame includes information indicating whether to allow association and information indicating the reason for association being allowed or failing. The association response frame further includes information on capabilities supportable by the AP. In case association is successfully done, normal frame exchange is done between the AP and STA. In case association fails, the association procedure is retried based on the information on the reason for the failure included in the association response frame or the STA may send a request for association to other AP.

In order to overcome limit to speed that is considered to be a weakness in WLAN, IEEE 802.11n has been established relatively in recent years. IEEE 802.11n aims to increase network speed and reliability while expanding wireless network coverage. More specifically, IEEE 802.11n supports high throughput (HT) that reaches data processing speed up to 540 Mbps and is based on MIMO (Multiple Inputs and Multiple Outputs) technology that adopts multiple antennas at both transmission end and reception end in order to optimize data speed and minimize transmission errors.

As WLAN spreads and more diversified applications using WLAN show up, a need for a new WLAN system arises for supporting a higher throughput than the data processing speed supported by IEEE 802.11n. The WLAN system supporting very high throughput (VHT) is a subsequent version of the IEEE 802.11n WLAN system, which is a new one recently suggested to support a throughput more than 500 Mbps for a single user and data processing speed more than 1 Gpbs for multiple users in an MAC service access point (SAP).

Advancing further than the existing WLAN system supporting 20 MHz or 40 MHz, the VHT WLAN system intends to support 80 MHz, contiguous 160 MHz, non-contiguous 160 MHz band transmission and/or more bandwidth transmission. Further, the VHT WLAN system supports 250 Quadrature Amplitude Modulation (QAM) that is more than a maximum of 64QAM of the existing WLAN system.

Since the VHT WLAN system supports a Multi User-Multiple Input Multiple Output (MU-MIMO) transmission method for higher throughput, the AP may transmit a data frame simultaneously to at least one or more MIMO-paired STAs. The number of paired STAs may be maximally 4, and when the maximum number of spatial streams is eight, each STA may be assigned up to four spatial streams.

Referring back to FIG. 1, in the WLAN system shown in the figure, the AP 10 may simultaneously transmit data to a STA group including at least one or more STAs among a plurality of STAs 21, 22, 23, 24, and 30 associated with the AP 10. In FIG. 1, by way of example, the AP conducts MU-MIMO transmission to the STAs. However, in a WLAN system supporting Tunneled Direct Link Setup (TDLS) or Direct Link Setup (DLS) or mesh network, a STA to transmit data may send a Physical Layer Convergence Procedure (PLCP) Protocol Data Unit (PPDU) to a plurality of STAs using an MU-MIMO transmission scheme. Hereinafter, an example where an AP transmits a PPDU to a plurality of STAs according to an MU-MIMO transmission scheme is described.

Data may be transmitted through different spatial streams to each STA. The data packet transmitted by the AP 10 may be referred to as a PPDU, which is generated at the physical layer of the WLAN system and transmitted, or a frame as a data field included in the PPDU. That is, the PPDU for Single User-Multiple Input Multiple Output (SU-MIMO) and/or MU-MIMO or data field included in the PPDU may be called a MIMO packet. Among them, the PPDU for MUs may be called an MU packet. In the example of the present invention, assume that a transmission target STA group MU-MIMO-paired with the AP 10 includes STA1 21, STA2 22, STA3 23, and STA4 24. At this time, no spatial stream is assigned to a specific STA in the transmission target STA group, so that no data may be transmitted to the specific STA. Meanwhile, assume that STAa 30 is associated with the AP but is not included in the transmission target STA group.

In the WLAN system, an identifier may be assigned to the transmission target STA group in order to support MU-MIMO transmission, and this identifier is denoted group ID. The AP sends a group ID management frame including group definition information for allocating group IDs to the STAs supporting MU-MIMO transmission and accordingly the group IDs are assigned to the STAs before PPDU transmission. One STA may be assigned a plurality of group IDs.

Table 1 below represents information elements included in the group ID management frame.

TABLE 1

| Order | Information |
|-------|-------------|
| 1 | Category |
| 2 | VHT action |

TABLE 1-continued

| Order | Information |
|---|---|
| 3 | Membership status |
| 4 | Spatial stream position |

The category field and VHT action field are configured so that the frame corresponds to a management frame and to be able to identify being a group ID management frame used in a next-generation WLAN system supporting MU-MIMO.

As in Table 1, the group definition information includes membership status information indicating whether to belong to a specific group ID, and in case of belonging to the group ID, information indicating the number of position to which the spatial stream set of the STA corresponds in all the spatial streams according to MU-MIMO transmission.

Since one AP manages a plurality of group IDs, the membership status information provided to one STA needs to indicate whether the STA belongs to each of the group IDs managed by the AP. Accordingly, the membership status information may be provided in the form of an array of subfields indicating whether it belongs to each group ID. The spatial stream position information indicates the position of each group ID, and thus, may be provided in the form of an array of subfields indicating the position of a spatial stream set occupied by the STA with respect to each group ID. Further, the membership status information and spatial stream position information for one group ID may be implemented in one subfield.

The AP, in case of sending a PPDU to a plurality of STAs through an MU-MIMO transmission scheme, transmits the PPDU, with information indicating a group identifier (group ID) in the PPDU as control information. When receiving the PPDU, a STA verifies whether it is a member STA of the transmission target STA group by checking the group ID field. If the STA is a member of the transmission target STA group, the STA may identify what number of position where the spatial stream set transmitted to the STA is located in the entire spatial stream. The PPDU includes information on the number of spatial streams allocated to the receiving STA, and thus, the STA may receive data by discovering the spatial streams assigned thereto.

Meanwhile, TV WS (White Space) draws attention as a newly available frequency band in the WLAN system. TV WS refers to an unused frequency band that is left as the analog TV broadcast is digitalized in the U.S. For example, TV WS includes a 54 to 598 MHz band. However, this is merely an example, and TV WS may be a permitted band that may be first used by a licensed user. The licensed user means a user that is permitted for use of a permitted band, and may also be referred to as a licensed device, primary user, or incumbent user.

The AP and/or STA operating in the TV WS should offer a protection function as to a licensed user, and this is because a licensed user has priority as to use of a TV WS band. For instance, in case a licensed user such as a microphone is already using a specific WS channel that is a frequency band split per protocol to have a certain bandwidth in the TV WS band, the AP and/or STA cannot use the frequency band corresponding to the WS channel in order to protect the licensed user. Further, the AP and/or STA should stop use of the frequency band if the licensed user happens to use the frequency band that is being used for transmission and/or reception of a current frame.

Accordingly, the AP and/or STA should first grasp whether a specific frequency band in the TV WS band is available, in other words, whether there is a licensed user in the frequency band. Grasping whether there is a licensed user in the specific frequency band is denoted spectrum sensing. As a spectrum sensing mechanism, an energy detection scheme or signature detection scheme may be utilized. If the strength of a received signal is higher than a predetermined value, it is determined that it is being used by a licensed user, or if a DTV preamble is detected, it may be determined to be being used by a licensed user.

Figure 2:
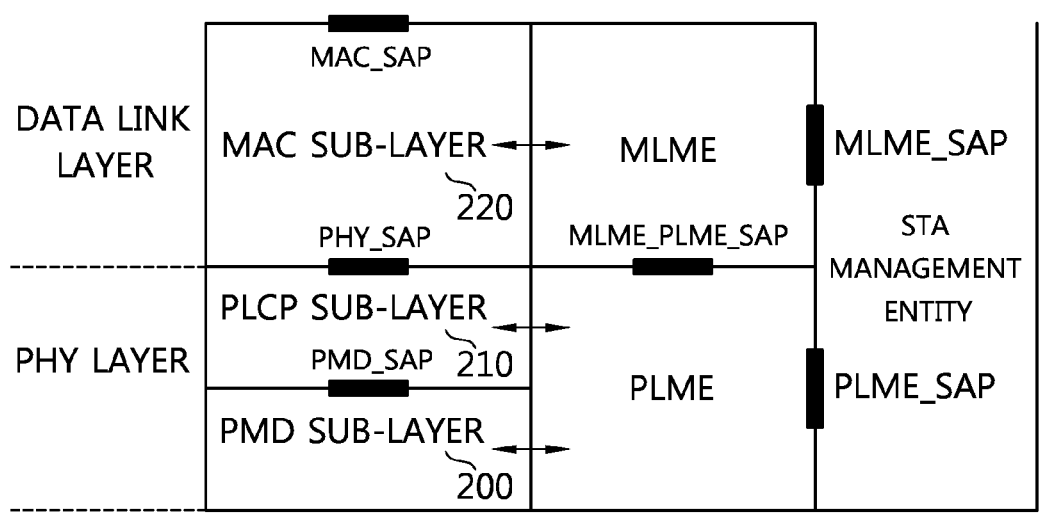
FIG. 2 is a view illustrating a physical layer architecture of a WLAN system supported by IEEE 802.11.

FIG. 2 is a view illustrating a physical layer architecture of a WLAN system supported by IEEE 802.11.

The IEEE 802.11 physical (PHY) architecture includes a PHY Layer Management Entity (PLME), a Physical Layer Convergence Procedure (PLCP) sublayer 210, and a Physical Medium Dependent (PMD) sublayer 200. The PLME provides a function of managing the physical layer in cooperation with the MAC Layer Management Entity (MLME). The PLCP sublayer 210 delivers an MAC Protocol Data Unit (MPDU) received from the MAC sublayer 220 to the PMD sublayer in response to an instruction of the MAC layer between the MAC sublayer 220 and the PMD sublayer 200 or delivers a frame coming from the PMD sublayer 200 to the MAC sublayer 220. The PMD sublayer 200 is a PLCP lower layer and enables transmission and reception of a physical layer entity between two stations through a radio medium. The MPDU delivered by the MAC sublayer 220 is denoted a Physical Service Data Unit (PSDU) in the PLCP sublayer 210. The MPDU is similar to the PSDU, but in case an aggregated MPDU (A-MPDU) obtained by aggregating a plurality of MPDUs is delivered, each MPDU may be different from each PSDU.

The PLCP sublayer 210 adds an additional field including information needed by a physical layer transceiver while delivering a PSDU from the MAC sublayer 220 to the PMD sublayer 200. At the time, the added field may include a PLCP preamble to the PSDU, a PLCP header, or tail bits necessary for turning a convolution encoder back into the zero state. The PLCP sublayer 210 receives from the MAC sublayer a TXVECTOR parameter including control information necessary to generate and transmit a PPDU and control information necessary for the STA to receive and analyze a PPDU. The PLCP sublayer 210 uses information included in the TXVECTOR parameter in generating a PPDU including the PSDU.

The PLCP preamble plays a role to let the receiver prepare for a synchronization function and antenna diversity before the PSDU is transmitted. The data field may include a coded sequence where the PSDU, padding bits attached to the PSDU, a service field including a bit sequence for initializing a scrambler, and the tail bits are encoded. At the time, as an encoding scheme, depending on the encoding scheme supported by the STA receiving the PPDU, Binary Convolution Coding (BCC) encoding or Low Density Parity Check (LDPC) encoding may be selected. The PLCP header includes a field including information on the PPDU to be transmitted, and this will be described in further detail below with reference to FIGS. 3 and 4.

Figure 3:
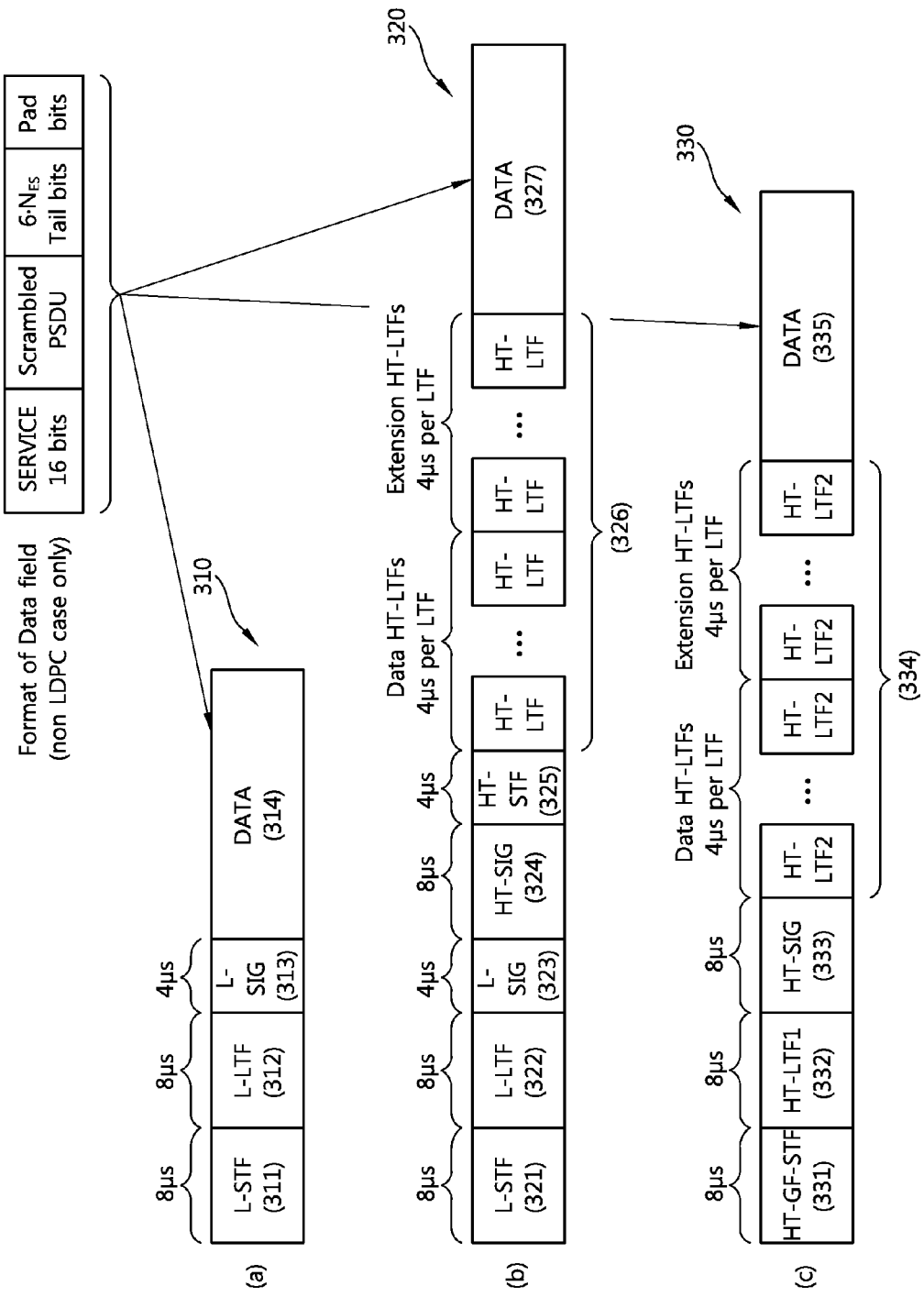
FIGS. 3 and 4 are block diagrams illustrating the format of a PPDU used in a WLAN system to which an embodiment of the present invention may apply.
Figure 4:
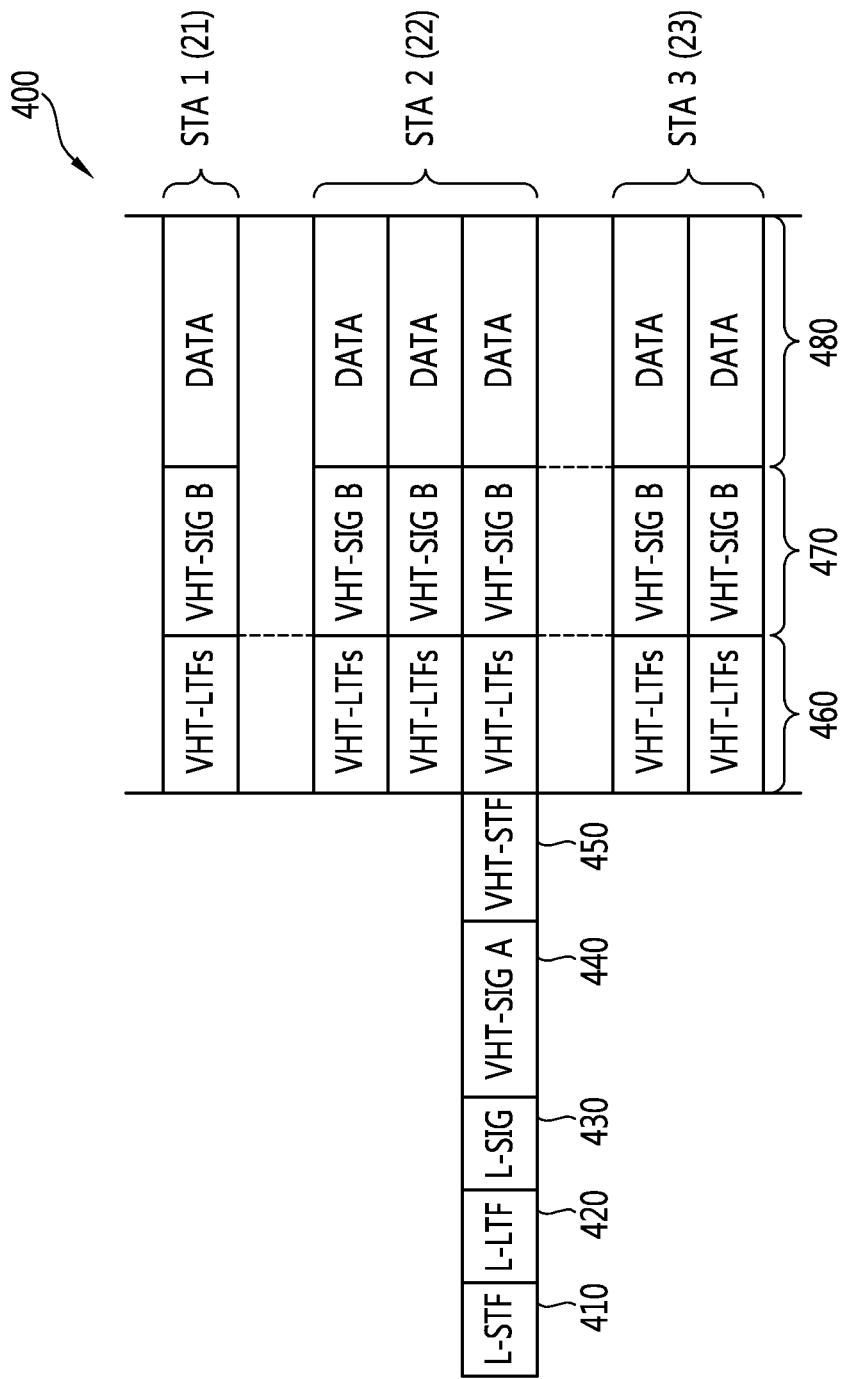

The PLCP sublayer 210 adds the above-described fields to the PSDU to thereby generate a PPDU and transmits the PPDU to a receiving station via the PMD sublayer, and the receiving STA receives the PPDU and obtains the information necessary for restoring data from the PLCP preamble and PLCP header and restores data. The PLCP sublayer of the receiving station delivers to the MAC sublayer the RXVECTOR parameter including the control information contained in the PLCP header and the PLCP preamble and may analyze the PPDU and obtain data in the receiving state FIGS. 3 and 4 are block diagrams illustrating the format of a PPDU used in a WLAN system to which an embodiment of the present invention may apply. Hereinafter, the STA operating in a legacy WLAN system based on IEEE 802.11a/b/g, existing WLAN Standards prior to IEEE 802.11n is referred to a legacy STA (L-STA). Further, the STA that may support HT in an HT WLAN system based on IEEE 802.11n is referred to as an HT-STA.

A sub-figure (a) of FIG. 3 illustrates the format of a legacy PPDU (L-PPDU) used in IEEE 802.11a/b/g that are existing WLAN system standards before IEEE 802.11n. Accordingly, in the HT WLAN system to which the IEEE 802.11n standard applies, the legacy-STA (L-STA) may transmit and receive an L-PPDU having the same format.

Referring to the sub-figure (a), the L-PPDU 310 includes an L-STF 311, an L-LTF 312, an L-SIG field 313, and a data field 314.

The L-STF 311 is used for frame timing acquisition, Automatic Gain Control (AGC) convergence, and coarse frequency acquisition.

The L-LTF 312 is used for frequency offset and channel estimation.

The L-SIG field 313 includes control information for demodulating and decoding the data field 314.

In the L-PPDU, the L-STF 311, the L-LTF 312, the L-SIG field 313, and the data field 314 may be transmitted in the order thereof.

A sub-figure (b) of FIG. 3 is a block diagram illustrating an HT-mixed PPDU format that enables an L-STA and an HT-STA to co-exist. Referring to the sub-figure (b), the HT-mixed PPDU 320 includes an L-STF 321, an L-LTF 322, an L-SIG field 323, an HT-SIG field 324, an HT-STF 325, and a plurality of HT-LTFs 326, and a data field 327.

The L-STF 321, L-LTF 322, and L-SIG field 323 are the same as those denoted by reference numerals 311, 312, and 313, respectively, of the sub-figure (a). Accordingly, the L-STA, even when receiving the HT-mixed PPDU 320, may analyze the data field through the L-STF 321, L-LTF 322, and L-SIG 323. However, the L-LTF 322 may further include information for channel estimation that is to be conducted for the HT-STA to receive the HT-mixed PPDU 320 and to decipher the L-SIG 323, HT-SIG 324, and HT-STF 325.

The HT-STA may be aware that the HT-mixed PPDU 320 is a PPDU for itself through the HT-SIG 324 coming after the L-SIG 323, and based on this, may demodulate and decode the data field 327.

The HT-STF 325 may be used for frame timing synchronization or AGC convergence for an HT-STA.

The HT-LTF 326 may be used for channel estimation to demodulate the data field 327. Since IEEE 802.11n supports SU-MIMO, there may be a plurality of HT-LTFs 326 for each data field transmitted in a plurality of spatial streams.

The HT-LTF 326 may consist of a data HT-LTF used for channel estimation for a spatial stream and an extension HT-LTF additionally used for full channel sounding. Accordingly, the number of the plurality of HT-LTFs 326 may be equal to or more than the number of spatial streams transmitted.

In the HT-mixed PPDU 320, the L-STF 321, L-LTF 322, and the L-SIG field 323 are first transmitted so that the L-STA may also receive it to thereby obtain data. Thereafter, the HT-SIG field 324 is transmitted for demodulating and decoding data transmitted for the HT-STA.

The HT-SIG field 324 and its precedents are transmitted without beamforming, so that the L-STA and the HT-STA may receive the PPDU to thereby obtain data, and the HT-STF 325, HT-LTF 326 and the data field 327 transmitted thereafter are subjected to radio signal transmission through precoding. Here, the HT-STF 325 is transmitted and then the plurality of HT-LTFs 326 and the data field 327 are transmitted so that a power variation by precoding may be taken into account by the STA conducting reception through precoding.

Although in the HT WLAN system, the HT-STA using 20 MHz uses 52 data subcarriers per OFDM symbol, the L-STA using the same frequency, 20 MHz, still makes use of 48 subcarriers per OFDM symbol. In order for backward compatibility with the existing systems, the HT-SIG field 324 in the HT-mixed PPDU 320 is decoded using the L-LTF 322, so that the HT-SIG field 324 is constituted of 48×2 data subcarriers. Thereafter, the HT-STF 325 and the HT-LTF 326 consists of 52 data subcarriers per OFDM symbol. As a result, the HT-SIG field 324 is supported with ½, BPSK (Binary Phase Shift Keying), each HT-SIG field 324 consists of 24 bits, and is thus transmitted with a total of 48 bits. In other words, channel estimation for the L-SIG field 323 and the HT-SIG field 324 utilizes the L-LTF 322, and the bit stream constituting the L-LTF 322 is represented as in Equation 1 below. The L-LTF 322 consists of 48 data subcarriers except a DC subcarrier per symbol.

$$L_{-26,26}=\{1,1,-1,-1,1,1,-1,1,-1,1,1,1,1,1,1,-1,-1,1,1,\\ 1,-1,1,-1,1,1,1,1,0,1,-1,-1,1,1,-1,1,-1,1,-1,\\ -1,-1,-1,-1,1,1,-1,-1,1,1,-1,1,-1,1,1,1,1,1\} \quad \text{Equation 1}$$

A sub-figure (c) of FIG. 3 is a block diagram illustrating an HT-greenfield PPDU 330 format that may be used only by an HT-STA. Referring to the sub-figure (c), the HT-GF PPDU 330 includes an HT-GF-STF 331, an HT-LTF1 332, an HT-SIG 333, a plurality of HT-LTF2s 334, and a data field 335.

The HT-GF-STF 331 is used for frame timing acquisition and AGC.

The HT-LTF1 332 is used for channel estimation.

The HT-SIG 333 is used for demodulating and decoding the data field 335.

The HT-LTF2 334 is used for channel estimation for demodulating the data field 335. Likewise, the HT-STA uses SU-MIMO and thus requires channel estimation for each data field transmitted I a plurality of spatial streams. Accordingly, a plurality of HT-LTFs 326 may be configured.

The plurality of HT-LTF2s 334 may consist of a plurality of extension HT-LTFs and a plurality of data HT-LTFs like the HT-LTFs 326 of the HT-mixed PPDU 320.

The data fields 314, 327, and 335, respectively shown in sub-figures (a), (b), and (c) of FIG. 3, each, may include a service field, a scrambled PSDU, a tail bit and a padding bit. The service field may be used for initializing a scrambler. The service field may be configured as 16 bits. In such case, seven bits may be configured for initializing a scrambler. The tail field may be configured as a bit sequence necessary for turning a convolution encoder back into a zero state. The tail field may be assigned a bit size that is proportional with the number of BCC encoders used for encoding data to be transmitted. More specifically, it may be configured to have six bits per BCC count.

FIG. 4 is a view illustrating an example of a PPDU format used in a WLAN system supporting VHT.

Referring to FIG. 4, the PPDU 400 may include an L-STF 410, an L-LTF 420, an L-SIG field 430, a VHT-SIGA field 440, a VHT-STF 450, a VHT-LTF 460, a VHT-SIGB field 470, and a data field 480.

The PLCP sublayer configuring the PHY adds necessary information to the PSDU delivered from the MAC layer to generate the data field 480, adds to it the L-STF 410, the L-LTF 420, the L-SIG field 430, the VHT-SIGA field 440, the VHT-STF 450, the VHT-LTF 460, and the VHT-SIGB field 470 or other fields to thereby generate the PPDU 400, and transmits it to one or more STAs through the PMD sublayer constituting the PHY. The control information necessary for the PLCP sublayer to generate the PPDU and the control information that is included in the PPDU and transmitted to be used for the receiving STA to interpret the PPDU are provided from the TXVECTOR parameter delivered from the MAC layer.

The L-STF 410 is used for frame timing acquisition, AGC convergence, and coarse frequency acquisition.

The L-LTF 420 is used for channel estimation to demodulate the L-SIG field 430 and the VHT-SIGA field 440.

The L-SIG field 430 is used for the L-STA to receive the PPDU 400 and interpret the PPDU 400 to thereby obtain data. The L-SIG field 430 includes a rate subfield, a length subfield, a parity bit and a tail field. The rate subfield is set with a value indicating a bit rate for data to be currently transmitted.

The length subfield is set as a value indicating the octet length of the PSDU by which the MAC layer sends a request for transmission to the PHY layer. At the time, a parameter related to the information on the octet length of the PSDU, L-LENGTH parameter, is determined based on a transmission time-related parameter, TXTIME parameter. TXTIME indicates a transmission time determined for transmission of the PPDU including the PSDU by the PHY layer, corresponding to the transmission time requested by the MAC layer for transmission of the PSDU. Accordingly, the L-LENGTH parameter is a time-related parameter, and thus, the length subfield included in the L-SIG field 430 ends up containing transmission time-related information.

The VHT-SIGA field 440 includes control information (or signal information) necessary for the STAs receiving the PPDU to interpret the PPDU 400. The VHT-SIGA field 440 is transmitted in two OFDM symbols. Accordingly, the VHT-SIGA field 440 may be split into a VHT-SIGA1 field and a VHT-SIGA2 field. The VHT-SIGA1 field includes information on the channel bandwidth used for PPDU transmission, identification information related to whether Space Time Block Coding (STBC) is to be used, information indicating one of the SU or MU-MIMO scheme in which the PPDU is transmitted, information indicating a transmission target STA group including a plurality of STAs MU-MIMO paired with the AP in case the transmission scheme is MU-MIMO, and information on a spatial stream assigned to each STA included in the transmission target STA group. The VHT-SIGA2 field includes short guard interval (GI)-related information.

The information indicating the MIMO transmission scheme and the information indicating the transmission target STA group may be implemented as one piece of MIMO indication information, and as an example, may be embodied as a group ID. The group ID may be set as a value having a specific range, and in the range, a predetermined value indicates the SU-MIMO transmission scheme, and the other values may be used as an identifier for the transmission target STA group in case the PPDU 400 is transmitted in the MU-MIMO transmission scheme.

If the group ID indicates that the PPDU 400 is transmitted through the SU-MIMO transmission scheme, the VHT-SIGA2 field includes coding indication information indicating whether the coding scheme applied to the data field is BCC or LDPC coding and Modulation Coding Scheme (MCS) information on a channel between transmitter and receiver. Further, the VHT-SIGA2 field may include an AID of the transmission target STA or a partial AID including some bit sequences of the AID.

If the group ID indicates that the PPDU 400 is transmitted through the MU-MIMO transmission scheme, the VHT-SIGA field 440 includes coding indicating information indicating whether the coding schemes applied to the data fields intended to be sent to the receiving STAs MU-MIMO paired are BCC or LDPC coding. In such case, the MCS information on each receiving STA may be included in the VHT-SIGB field 470.

The VHT-STF 450 is used for enhancing the ACG estimation capabilities in MIMO transmission.

The VHT-LTF 460 is used for a STA to estimate an MIMO channel. Since the next-generation WLAN system supports MU-MIMO, as many VHT-LTFs 460 as the number of spatial streams where the PPDU 400 is transmitted may be configured. Additionally, full channel sounding is supported, and in case this is conducted, the number of VHT LTFs may increase.

The VHT-SIGB field 470 includes dedicated control information necessary for a plurality of MIMO paired STAs to receive the PPDU 400 to obtain data. Accordingly, only when the control information included in the PPDU 400 indicates that the currently received PPDU 400 is MU-MIMO transmitted, the STA may be designed to decode the VHT-SIGB field 470. On the contrary, in case the control information included in the VHT-SIGA field 440 indicates that the currently received PPDU 400 is one for a single STA (including SU-MIMO), the STA may be designed not to decode the VHT-SIGB field 470.

The VHT-SIGB field 470 may contain information on the MCS for each STA and information on rate matching. Further, it may contain information indicating the PSDU length included in the data field for each STA. The information indicating the length of the PSDU is information indicating the length of the bit sequence of the PSDU and may perform such information on a per-octet basis. Meanwhile, in case the PPDU is SU-transmitted, the information on the MCS is included in the VHT-SIGA field 440, so that it might not be included in the VHT-SIGB field 470. The size of the VHT-SIGB field 470 may vary depending on the type of the MIMO transmission (MU-MIMO or SU-MIMO) and channel bandwidth used for transmission of the PPDU.

The data field 480 includes data which intends to be sent to the STA. The data field 480 includes a service field for initializing a scrambler and PSDU where an MPDU is delivered in the MAC layer, a tail field including a bit sequence necessary to turn the convolution encoder back into zero state, and padding bits for normalizing the length of the data field. In the case of MU transmission, the data field 480 transmitted to each STA may include a data unit whose transmission is intended, and the data unit may be an A-MPDU.

In the WLAN system as shown in FIG. 1, in case the AP 10 attempts to send data to STA1 21, STA2 22, and STA3 23, a PPDU may be transmitted to the STA group including STA1 21, STA2 22, STA3 223, and STA4 24. In such case, as shown in FIG. 4, no spatial stream may be assigned to STA4 24, and a specific number of spatial streams are assigned to each of the STA1 21, STA2 22, and STA3 23, and data may be transmitted accordingly. In the example as illustrated in FIG. 4, one spatial stream may be assigned to STA1 21, three to STA2 22, and two to STA3 23.

Figure 5:
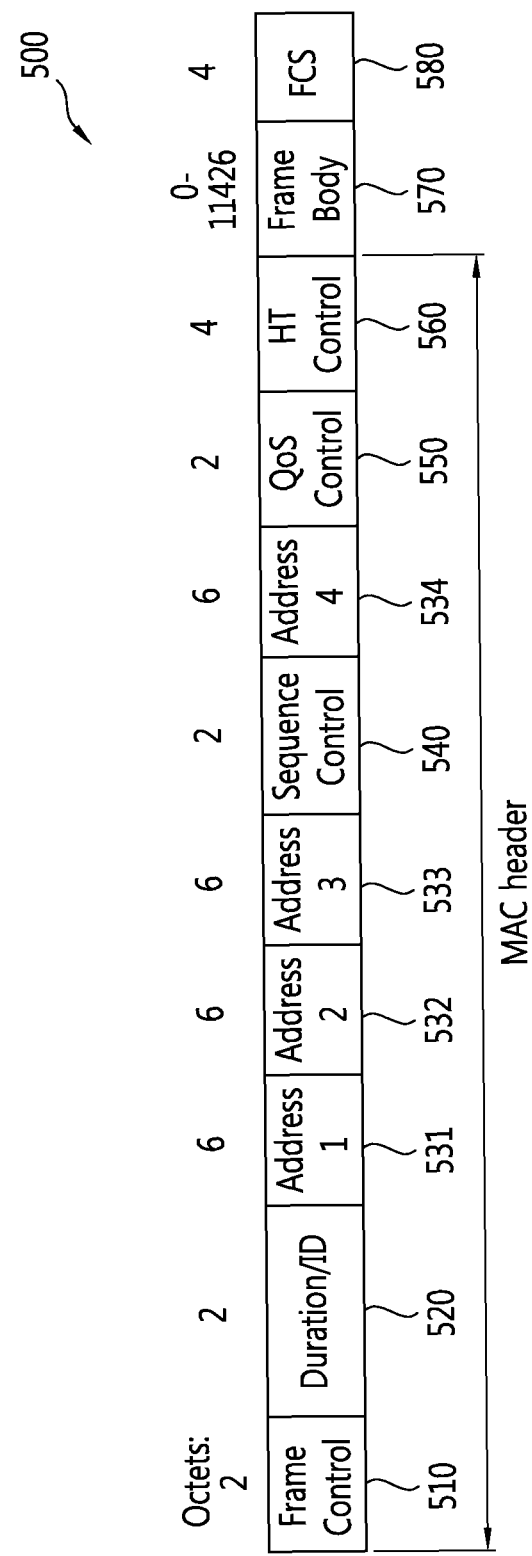
FIG. 5 is a block diagram illustrating the format of an MAC frame provided in a WLAN system.

FIG. 5 is a block diagram illustrating the format of an MAC frame provided in a WLAN system. The MAC frame may be an MPDU (in case of being delivered in PHY layer, PSDU) included in the data field of the above-described PPDU.

Referring to FIG. 5, the MAC frame 500 includes a frame control field 510, a duration/ID field 520, an address 1 field 531, an address 2 field 532, an address 3 field 533, a sequence control field 540, an address 4 field 534, a QoS control field 550, an HT control field 560, a frame body 570, and an Frame Check Sequence (FCS) field 580.

The frame control field 510 includes information on frame characteristics. The frame control field may contain protocol version information indicating the version of the WLAN standards supported by the frame 500 and information on the type and subtype for identifying the function of the frame.

The duration/ID field 520 may be implemented to have different values depending on the type and subtype of the MAC frame 500. In case the type and subtype of the MAC frame 500 are PS-poll frames for power saving operation, the duration/ID field 520 may be configured to include the AID of the STA that has sent the MAC frame 500. In other cases, the duration/ID field 520 may be configured to have a specific duration value depending on the type and subtype of the MAC frame 500. In case the MAC frame 500 is an MPDU included in the A-MPDU format, the duration/ID field 520 included in the MAC header of each MPDU may be implemented to have the same value.

The frame body 570 may include data that a receiving STA and/or AP intends to send. The frame body 570 may include a control frame, a management frame, an action frame, and/or a data frame with a body component except the MAC header and FCS. In case the MAC frame 500 is a management frame and/or action frame, the information elements contained in the management frame and/or action frame may be implemented in the frame body 570.

The FCS field 580 includes a bit sequence for CRC.

FIG. 6 is a block diagram illustrating an example frame control field format of an MAC frame.

Referring to FIG. 6, the frame control field 600 includes a protocol version subfield 605, a type subfield 610, a subtype subfield 615, a to DS subfield 620, a from DS subfield 625, a more fragment subfield 630, a retry subfield 635, a power management subfield 640, a more data subfield 645, a protected frame subfield 650, and an order subfield 655.

The protocol version subfield 605 may be configured to indicate the version of a WLAN protocol applied to the MAC frame.

The type subfield 610 and the subtype subfield 615 may be configured to indicate information for identifying the function of a frame including the frame control field 600.

The to DS subfield 620 and the from DS subfield 625 may be configured as shown in Table 2 below.

TABLE 2

| To DS and From DS values | Description |
| --- | --- |
| To DS = 0, From DS = 0 | Means a data frame directly transmitted from one STA to another STA in the same IBSS, a data field directly transmitted from one non-AP STA to another non-AP STA in the same BSS, or a data field transmitted outside the BSS structure. Or, every management frame or control frame may be configured as such. |
| To DS = 1, From DS = 0 | Means a data field transmitted to DS or a data field transmitted to AP's port access entity by STA associated with the AP. |
| To DS = 0, From DS = 1 | Means a data field escaping from DS or a data field transmitted by AP's port access entity. |
| To DS = 1, From DS = 1 | Data frame of format using four addresses |

The address 1 field 531 to the address 4 field 534 may be configured to implement specific fields among a BSSID field indicating a BSSID, an SA field indicating a source address (SA), a DA field indicating a destination address (DA), a TA (transmitting address) field indicating a transmitting STA address, and an RA (Receiving Address) field indicating a receiving STA address. Meanwhile, the address field embodied as a TA field may be set as a bandwidth signaled TA value, and in such case, the TA field may indicate that the frame contains additional information in the scrambling sequence. The bandwidth signaled TA may be represented in an MAC address of the STA transmitting the frame, but the individual/group bit included in the MAC address may be set as a predetermined value, e.g., 1.

The sequence control field 540 is configured to include a sequence number and a fragment number. The sequence number may indicate a sequence number assigned to the MAC frame 500. The fragment number may indicate the number of each fragment in the MAC frame 500.

The QoS control field 550 includes information related to QoS.

The HT control field 560 includes control information related to a HT transmission/reception scheme and/or VHT transmission/reception scheme. The implementation of the HT control field 560 is described in further detail below.

The more fragment subfield 630 may be configured to indicate whether there is a fragment to be sent subsequent to the MAC frame.

The retry subfield 635 may be configured to indicate whether the MAC frame is the one obtained by re-transmitting a previous frame.

The power management subfield 640 may be configured to indicate the STA's power management mode.

The more data subfield 645 may be configured to indicate whether there is a frame that is to be additionally sent.

The protected frame subfield 650 may be configured to include information indicating whether a frame body has been processed by an encryption encapsulation algorithm.

In the MAC frame format shown in FIG. 5, it has been already described above that four address fields may be configured to implement a BSSID field, an SA field, a DA field, a TA field, and an RA field. Meanwhile, the four address fields may be implemented differently depending on the configuration of the to DS subfield and from DS subfield of the frame control field. The four address fields may be implemented as shown in Table 3 according to the configuration of the to DS subfield and from DS subfield.

TABLE 3

| To DS | From DS | Address 1 | Address 2 | Address 3 MSDU | Address 3 A-MSDU | Address 4 MSDU | Address 4 A-MSDU |
|---|---|---|---|---|---|---|---|
| 0 | 0 | RA = DA | TA = SA | BSSID | BSSID | N/A | N/A |
| 0 | 1 | RA = DA | TA = BSSID | SA | BSSID | N/A | N/A |
| 1 | 0 | RA = BSSID | TA = SA | DA | BSSID | N/A | N/A |
| 1 | 1 | RA | TA | DA | BSSID | SA | BSSID |

Meanwhile, as various communication services such as smart grid and e-Health, or ubiquitous services appear, the Machine to Machine (M2M) to support such services draws attention. A sensor for sensing temperature or moisture, a camera, a home appliance such as a TV, or a bulky machine including a factory processing machine or a vehicle may be one element of an M2M system. Elements constituting an M2M system may transmit and receive data based on WLAN communication. In case devices of an M2M system supports WLAN and configure a network, the system is hereinafter referred to as an M2M WLAN system.

The M2M-supportive WLAN system has the following features.

1) Large number of stations: Unlike an existing network, M2M is on the basis of an assumption that a large number of STAs exist within a BSS. This is because, sensors, or the like, installed in houses, companies, and the like, are all considered. Thus, a considerably large number of STAs may be connected to a single AP.

2) Low traffic load per STA: Since an STA has a traffic pattern of collecting and reporting surrounding information, information is not required to be frequently sent and an amount of information is small.

3) Uplink-centered communication: M2M has a structure in which a command is mainly received by downlink, an action is taken, and result data is reported to uplink. Primary data is generally transmitted in uplink, so in a system supporting M2M, uplink is the core.

4) Power management of STA: An M2M terminal largely operates with a battery, so it is difficult for a user to frequently charge it in many cases. Thus, a power management method for minimizing battery consumption is required.

5) Automatic recovery function: it is difficult for a user to directly manipulate a device constituting an M2M system in a particular situation, so the device is required to have a self-recovery function.

A next-generation WLAN system adopting such M2M communication is presently in discuss. A noticeable feature of the WLAN system is that its service coverage reaches a radius of 1 km or more within a non-licensed band of 1 GHz or less except for the TV WS band, and this means that the system may provide considerably increased service coverage as compared with the existing indoor use-centered WLAN. In other words, unlike the existing bands, 2.4 GHz and 5 GHz, a band of 1 GHz or less, represented by 700 to 900 MHz, is used for operating the WLAN, the characteristics of RF waves having the corresponding band enable the AP coverage to be expanded by approximately two or three times under the same transmission power. In such case, a number of STA may gain access to an AP. The usage taken into consideration for the next-generation WLAN may be as follows:

Use Example 1

Sensors and Meters

1a: smart grid-meter to pole
1c: environmental/agricultural monitoring
1d: industrial process sensors
1e: healthcare
1f: healthcare
1g: home/building automation
1h: home sensors Use Example 2

Backhaul Sensors and Meta Data

Backhaul aggregation of sensors
Backhaul aggregation of industrial sensors

Use Example 3

Extended Range Wi-Fi

Outdoor extended range hotspot
Outdoor Wi-Fi for cellular traffic offloading

Use example 1 above, sensors and meters, is an example in which the above-described M2M is used. In usage 1, various types of sensor devices may be connected to an AP in a WLAN system to perform communication. Particularly in the case of smart grid, up to 6000 sensor devices may gain access to a single AP.

In use example 2, backhaul sensors and data meters, an AP providing broad coverage serves as a backhaul link of another communication system.

Use example 3 aims to provide an outdoor extended range of hotspot communications such as extended home service coverage, campus service coverage, or shopping mall service coverage or aims to allow the AP to distribute overloaded cellular traffic by offloading traffic for cellular mobile communication.

The present invention offers the format of a data unit for an apparatus that operates in a sub 1 GHz, as discussed in the next-generation WLAN standards. More specifically, the present invention suggests the architecture of an effective physical layer preamble for an apparatus operating in a sub 1 GHz. Hereinafter, data units as provided herein, i.e., PPDUs, may be sequentially sent in the form of OFDM symbols according to the order in which they are included in the field.

The communication in a sub 1 GHz has significantly broad service coverage as compared with the existing indoor-centered WLAN systems in view of the characteristics of the radio waves. For this, it may be implemented in such a form that the nature of the physical layer (PHY) in the existing VHT WLAN system is 1/10 down-clocked. In such case, the 20/40/80/160/80+80 MHz channel bandwidths in the VHT WLAN system are provided as 2/4/8/16/8+8 MHz channel bandwidths in a sub 1 GHz through the 1/10 down clocking. Accordingly, the guard interval (GI) is increased by 10 times from 0.8 us, which is an existing one, to 8us. Table 4 below shows comparisons in physical layer performance between the physical layer in the VHT WLAN system and the physical layer in a WLAN system based on a 1/10 down clocked sub 1 GHz.

TABLE 4

| PHY of VHT WLAN system | | PHY of WLAN system based on 1/10 down clocked sub 1 GHz | |
|---|---|---|---|
| channel bandwidth | throughput | channel bandwidth | throughput |
| 20 MHz | 86.7 Mbps | 2 MHz | 8.67 Mbps |
| 40 MHz | 200 Mbps | 4 MHz | 20 Mbps |
| 80 MHz | 433.3 Mbps | 8 MHz | 43.33 Mbps |
| 160 MHz | 866.7 Mbps | 16 MHz | 86.67 Mbps |
| 80 + 80 MHz | 866.6 Mbps | 8 + 8 MHz | 86.66 Mbps |

Hereinafter, for ease of description, assuming that the PHY characteristics of the VHT WLAN system are 1/10 down clocked, an example where the duration of one OFDM symbol is 40 us is described. However, the scope of the present invention according to an embodiment of the present invention is not limited to the specific values.

Since in a sub 1 GHz there is no legacy device that is conventionally in consideration, it may be critical to design the PHY preamble to be effectively applicable to a sub 1 GHz as possible without the need of considering backward compatibility. Taking this into account, the PPDU format as shown in FIG. 7 is offered.

Figure 7:
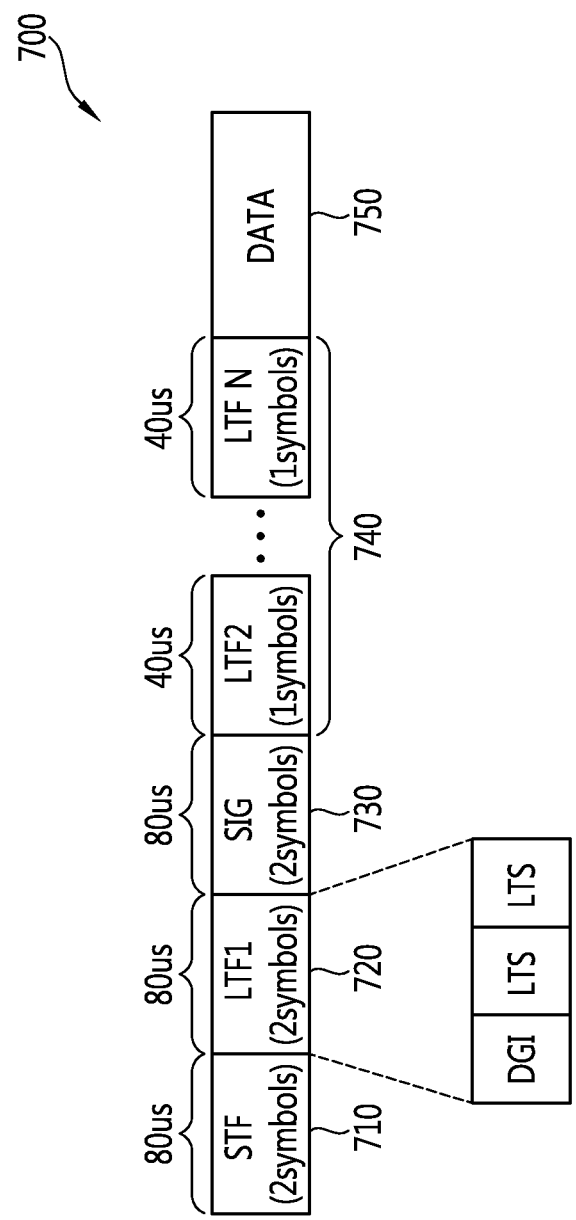
FIG. 7 is a block diagram illustrating an example PPDU format in the transmission through a sub 1 GHz according to an embodiment of the present invention.

FIG. 7 is a block diagram illustrating an example PPDU format in the transmission through a sub 1 GHz according to an embodiment of the present invention.

Referring to FIG. 7, the PPDU 700 has an architecture that is obtained by 1/10 down clocking an HT-GF PPDU format as shown in a sub-figure (c) of FIG. 3. The PPDU 700 includes an STF 710, an LTF1 720, an SIG field 730, at least one LTF2 740, and a data field 750. The STF 710 is used for frame timing acquisition and AGC.

The STF 710 consists of two OFDM symbols, each having a length of 40 us, and thus, provides 80 us OFDM symbol duration in total.

The LTF1 720 is used for channel estimation. The LTF1 720 consists of two OFDM symbols, each having a length of 40 us, and thus, provides 80 us OFDM symbol duration in total. The LTF1 includes a Double Guard Interval (DGI) and two Long Training Symbols (LTSs).

The SIG field 730 is used for demodulation and decoding of the data field 750. The SIG field 730 consists of two OFDM symbols, each having a length of 40 us, and thus provides 80 us OFDM symbol duration in total.

At least one LTF 740 is used for channel estimation to demodulate the data field 750. Each LTF consists of one OFDM symbol, and has 40 us OFDM symbol duration.

When sending a PPDU having the format as shown in FIG. 7, 160 us in total is required until the SIG field 730 is transmitted. The PPDU having such format may be used for transmission of a 2 MHz or more channel bandwidth.

Figure 8:
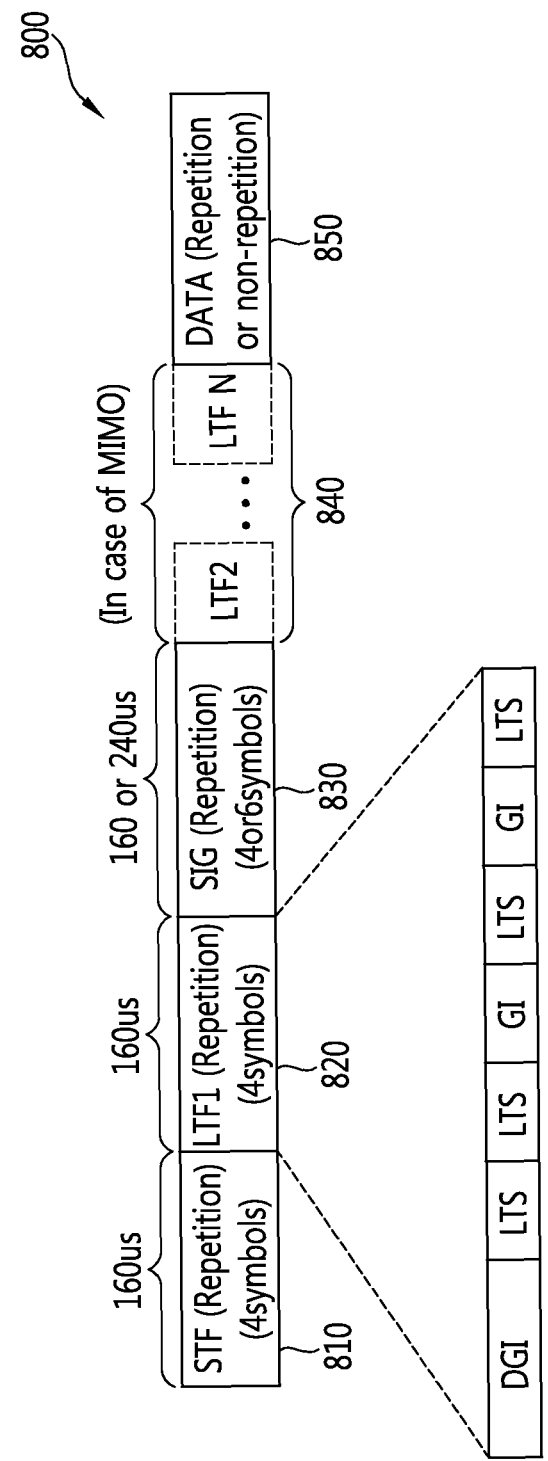
FIG. 8 is a block diagram illustrating an example PPDU format for 1 MHz bandwidth transmission in a sub 1 GHz according to an embodiment of the present invention.

Meanwhile, in order for expanded coverage communication, a PPDU format as shown in FIG. 8, to which OFDM symbol repetition is applied in which the STF, LTF, SIG and/or data fields included in the PPDU having the format shown in FIG. 7 are repeated on twice or more as much as the time or frequency axis may be suggested.

FIG. 8 is a block diagram illustrating an example PPDU format for 1 MHz bandwidth transmission in a sub 1 GHz according to an embodiment of the present invention.

Referring to FIG. 8, the PPDU 800 may include an STF 810, an LTF1 820, an SIG field 830, and a data field 850. In case the PPDU is for MIMO transmission, at least one or more LTFs (LTF2 to LTFN, 840) may be added depending on the number of spatial streams used.

According to the STF 810 and LTF1 820, as compared with the STF 710 and LTF1 720 described above in connection with FIG. 7, OFDM symbols can be seen to be formed repeatedly. That is, each OFDM symbol(s) constituted of a bit sequence originally configuring the STF and LTF1 stand repeated.

Accordingly, the STF 810 consists of four OFDM symbols, each having a length of 40 us, and thus provides 160 us OFDM symbol duration in total. The LTF1 820 also consists of four OFDM symbols, each having a length of 40 us, and thus provides 160 us OFDM symbol duration in total. In other words, in case the PPDU shown in FIG. 8 is provided, the time of transmission of the preamble part is increased to 320 us, which is twice as much as the time taken to send the PPDU shown in FIG. 7.

Meanwhile, since one LTF1 820 symbol includes a DGI and two LTSs when viewed in the time domain, when simply repeated, it can be configured in the order of a DGI, two LTSs, a DGI, and two LTSs. However, the repeated LTF symbols may be implemented to apply two GIs instead of the DGIs. Accordingly, the LTF1 symbol may be embodied to have a DGI, two LTSs, a GI, an LTS, a GI, and an LTS.

The SIG field 830 may also be formed with repeated OFDM symbols, but the SIG field 830 may be configured by being repeated twice or more.

When a PPDU is sent through a plurality of spatial streams as MIMO transmission is done, at least one LTF 840 and data field 850, which may be contained in the PPDU 800, might not be applied with OFDM symbol repetition.

As shown in FIG. 8, the PPDU format applied with OFDM symbol repetition may be adopted to transmit and receive frames for service coverage that has been further broaden by use of a 1 MHz channel bandwidth.

Meanwhile, in the PPDU format for the above-described 1 MHz bandwidth transmission, information signaling whether OFDM symbol repetition is to be applied to the LTF2 to LTFN and data field may be needed. For such purpose, the MCS subfield in the SIG field may be configured to indicate whether OFDM symbol repetition applies.

Hereinafter, for ease of description, the lowest MCS level with no repetition is assumed to be MCS 1, and the highest MCS level is assumed to be MCS 8. At the time, OFDM symbol repetition is applied which repeats the OFDM symbol set as MCS1 on time or frequency axis to thereby generate a one-step lower MCS level, which is referred to as MCS 0. A total of MCS levels have nine steps from MCS 0 to MCS 8, and MCS 0 only is applied with OFDM symbol repetition, so that the entire symbol length approximately doubles. If the above-described PPDU for 1 MHz bandwidth transmission applies, the STF, LTF1, and SIG field of the PPDU are applied with OFDM symbol repetition when the PPDU is transmitted. Meanwhile, at least one LTF (LTF2 to LTFN) and data field that are included in the case of MIMO transmission might not be applied to OFDM symbol repetition as described above. Whether OFDM symbol repetition applies or not may be indicated by an MCS level. That is, if the MCS subfield of the SIG field indicates MCS0, LTF2 to LTFN and the data fields are applied with OFDM symbol repetition, and if the MCS subfield indicates other MCS level, each LTF is transmitted in one OFDM symbol, and the data field may be transmitted in at least one or more OFDM symbols without symbol repetition.

Figure 9:
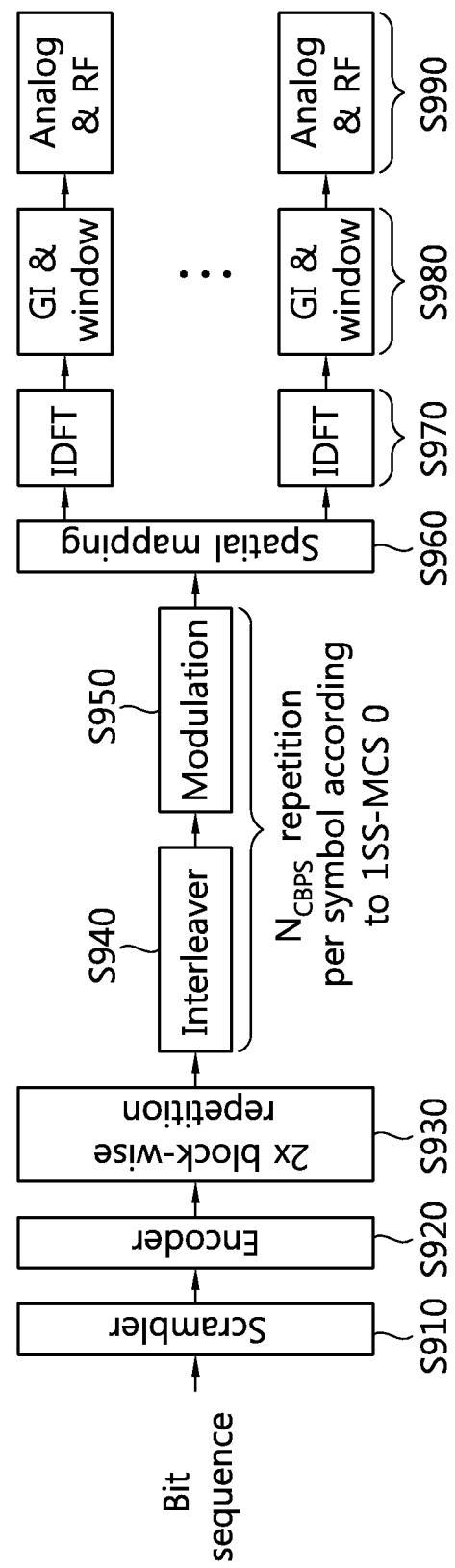
FIG. 9 is a view illustrating an example transmission method by a transmission STA according to an embodiment of the present invention.

Meanwhile, in case OFDM symbol repetition applies with the lowest MCS level, MCS0, upon 1 MHz transmission in a sub 1 GHz, FIG. 9 may be referenced for transmission flow.

FIG. 9 is a view illustrating an example transmission method by a transmission STA according to an embodiment of the present invention.

Referring to FIG. 9, the transmission STA scrambles a bit sequence to be sent, based on a specific scrambling sequence (S910).

The scrambled bit sequence is encoded to generate an encoded bit sequence (S920). As an encoding scheme, Forward Error Correction (FEC) coding may apply, whose example, a Binary Convolution Code (BCC) encoding scheme, may be utilized. Meanwhile, when encoded as such, the encoded bit sequence may be added with tail bits.

The encoded bit sequence is 2× blockwise repeated to generate a repeated bit sequence (S930). Meanwhile, in case the encoded bit sequence is repeated based on FEC coding, the tail bits, added by the encoding, are also repeated.

The repeated bit sequence is interleaved by an interleaver (S940), and the interleaved bit sequence is modulated to thereby generate symbols (S950). As a demodulation scheme, a Binary Phase Shift Keying (BPSK) scheme may be used. Meanwhile, after demodulation, each generated symbol is assigned with a number of bits ($N_{CBPS}$) defined in case the MCS level is MCS 0 and transmission is made through one spatial stream.

In the case of MIMO transmission, the demodulated symbols are mapped with a spatial stream (S960), and the mapped signal is subjected to Inverse Discrete Fourier Transform (IDFT), thus generating OFDM symbols (S970). An inter-OFDM symbol guard interval (GI) is inserted (S980), and is then transmitted (S990). Meanwhile, in the case of transmission other than MIMO transmission, the demodulated symbols are immediately subjected to IDFT, thereby generating OFDM symbols. Thereafter, an inter-symbol GI is inserted, and is then transmitted.

In case a data unit is transmitted or received using a PPDU format supported in a next-generation WLAN system as above, the duration of one PPDU is prolonged too much, and thus is insufficient in light of data processing. To address this, it is raised as a crucial issue to compress the length of the bit sequence configuring the MAC header of the MAC frame in the PPDU as well as to reduce the length of the preamble of the PPDU. Hereinafter, a method of transmitting and receiving data through an MAC header compression scheme that may apply for efficient data transmission in the whole WLAN system under a next-generation WLAN system environment is described in further detail.

For the method of transmitting and receiving data based on the MAC header compression scheme as suggested herein, the AP is assumed to be able to serve as a router.

Figure 10:
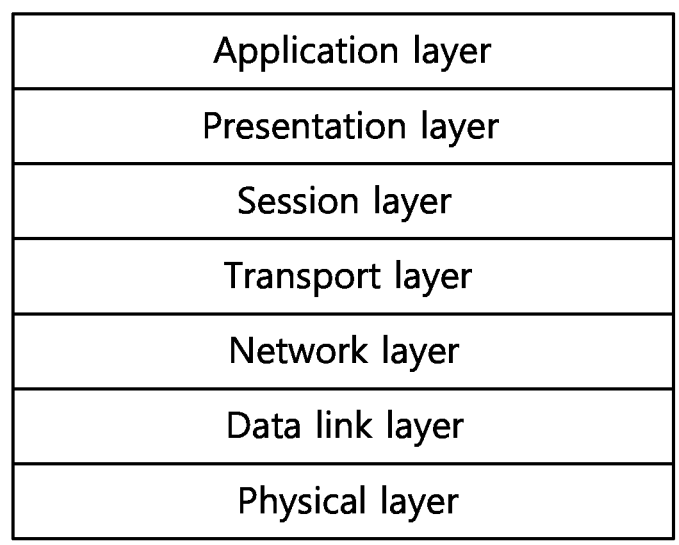
FIG. 10 is a view illustrating the OSI seven layer model. In the OSI 7 layer model, the computer network protocol design and communication are split into layers.

FIG. 10 is a view illustrating the OSI seven layer model. In the OSI 7 layer model, the computer network protocol design and communication are split into layers.

In general, when an AP fails to play a role as a router, the AP may conduct only the physical layer and data link layer (MAC layer) functions. Accordingly, in order for the AP to receive a frame and to deliver the frame to a right destination, four addresses, such as SA, DA, TA, and RA are required. For this, as described above, the MAC header includes four address fields.

As described above in connection with Table 3, depending on the to DS subfield and the from DS subfield value, the four address fields included in the MAC header are configured to have different values. In general, in case the to DS subfield and the from DS subfield are both set as 1's, since this is not supported in the current WLAN system, the four address fields might not be used. Accordingly, in case the AP fails to serve as a router, three address fields need to be configured in order for the AP to receive a frame and to deliver the frame to an intended destination.

In contrast, if the AP may function as a router and thus may conduct the functions of the physical layer, data link layer (MAC layer), and network layer/transport layer (TCP/IP layer), the AP in the MAC layer may carry out frame transmission and reception only with the TA and RA except the SA and DA.

As such, in order to compress the size of the MAC header with only the fields for two addresses, such as TA and RA, included in the MAC header as address fields, the AP should be able to serve as a router. Since all APs cannot function as a router, the AP needs to provide capability information on whether it can function to do it. In other words, an MAC header compression configuring process may be required to initiate data transmission and reception based on MAC header compression between the AP and the STA. For this, an extended capabilities information element having the format shown in FIG. 11 is offered.

Figure 11:
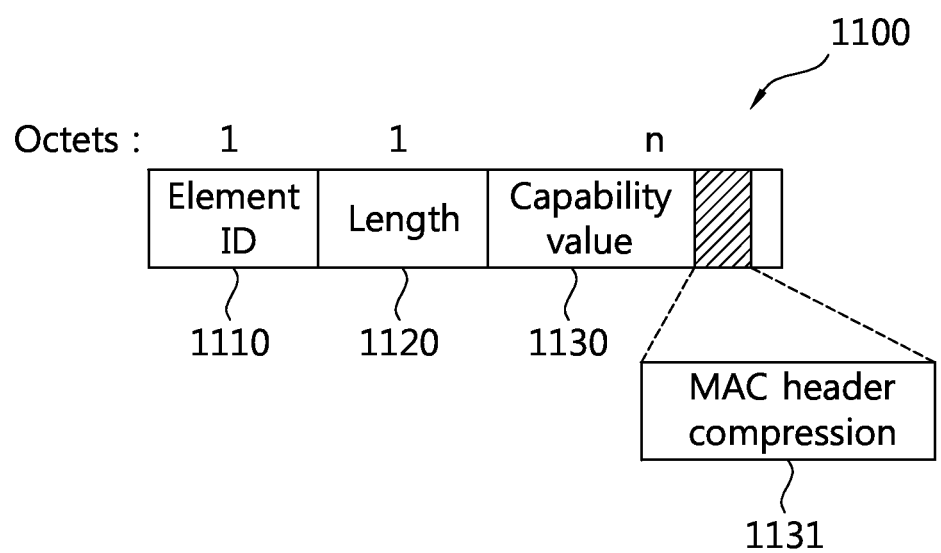
FIG. 11 is a block diagram illustrating the format of an extended capabilities information element according to an embodiment of the present invention.

FIG. 11 is a block diagram illustrating the format of an extended capabilities information element according to an embodiment of the present invention.

Referring to FIG. 11, the extended capabilities information element 1100 includes an element ID field 1110, a length field 1120, and a capabilities field 1130.

The element ID field 1110 may be configured to indicate that the information element is the extended capabilities information element 1100.

The length field 1120 may be configured to indicate the length of the capabilities field 1130.

The capabilities field 1130 implements information on capabilities supported by the STA and/or AP that sends the extended capabilities information element 1100. The capabilities field 1130 may include an MAC header compression subfield 1131 indicating whether the STA and/or AP may support MAC header compression. The MAC header compression subfield 1131 may be a subfield having a one-bit size. If supporting MAC header compression, the MAC header compression subfield is set as 1, and otherwise, is set as 0. Meanwhile, the example bit values may be implemented to be opposite each other.

If the AP sends the extended capabilities information element 1100, the STA then receives the extended capabilities information element 1100 and identifies the value of the MAC header compression subfield 1131 to determine whether the AP may support MAC header compression. On the contrary, if the STA sends the suggested extended capabilities information element 1100, the AP receives the extended capabilities information element 1100 and identifies the value of the MAC header compression subfield 1131 to determine whether the STA may support MAC header compression.

The extended capabilities information element 1100 may be transmitted in an association request frame, association response frame, re-association request frame, re-association response frame, probe request frame, probe response frame, and/or beacon frame.

In case only the TA field for the TA, which is a transmitter address, and the RA field for the RA, which is a receiver address, are included as address fields in the MAC header through MAC header compression, the TA field and RA field have values that are determined depending on the frame transmission direction. This may be configured as shown in Table 5 below.

TABLE 5

| Transmission direction | TA | RA |
|---|---|---|
| DL | AP address | STA address |
| UL | STA address | AP address |

Referring to Table 5, in the case of downlink (DL) transmission, the TA is set as the address of the AP that sends a frame, and the RA is set as the address of the STA. In the case of uplink (UL) transmission, the TA is set as the STA that sends a frame, and the RA is set as the AP.

Upon configuring the TA and the RA as described above, the STA's MAC address is used as the STA's address. However, a bit sequence configuring the MAC address may be configured to have a very large length of, e.g., 48 bits. Accordingly, for compression of the MAC header, the STA's address may be set as an AID assigned when the STA is associated with the AP, instead of the STA's MAC address. As such, in case the STA's AID applies, each address field may be configured as shown in Table 6.

TABLE 6

| Transmission direction | TA | RA |
|---|---|---|
| DL | BSSID | STA AID |
| UL | STA AID | BSSID |

As such, in case the AID is used as the STA's address, since the AID may be configured of 14 bits whereas the bit sequence for the existing MAC address has 48 bits, the length of the address field in the MAC header may be shortened.

Meanwhile, in case the AID is used as the STA's address instead of the MAC address, since the AID is utilized as the address of an individual STA, it might not be proper for the purpose of indicating and/or identifying receiving STAs of the frames transmitted in a multicast manner.

To address such issue, it is offered for the AP to map a multicast address to a specific AID value. In general, an AID may be implemented as a bit sequence that is 14 bits long, and the AID may have a value between 0 and 8191. The AP may reserve any value in this range that may be set as an AID value as the AID mapped with the multicast address.

The STA sends a query for an AID address that is mapped with the multicast address of a multicast frame that the STA desires to receive from the AP in order to receive a multicast frame. For such purposes, the STA may send an AID request frame to the AP.

Figure 12:
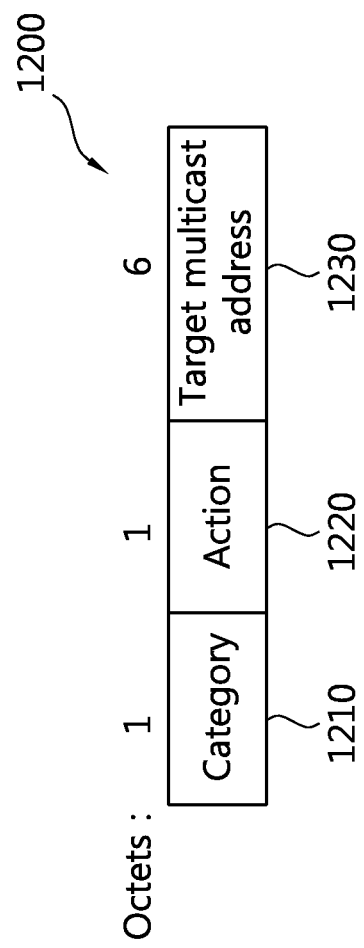
FIG. 12 is a block diagram illustrating an example of the format of a multicast AID request frame according to an embodiment of the present invention.

FIG. 12 is a block diagram illustrating an example of the format of a multicast AID request frame according to an embodiment of the present invention.

Referring to FIG. 12, the multicast AID request frame 1200 includes a category field 1210, an action field 1220, and a target multicast address field 1230.

The category field 1210 and the action field 1220 may be configured to indicate that the frame is the multicast AID request frame 1200.

The target multicast address field 1230 may be configured to indicate a target multicast address associated with a multicast frame that desires to be received.

When receiving the multicast AID request frame from the STA, the AP may send an AID response frame to the STA in response.

Figure 13:
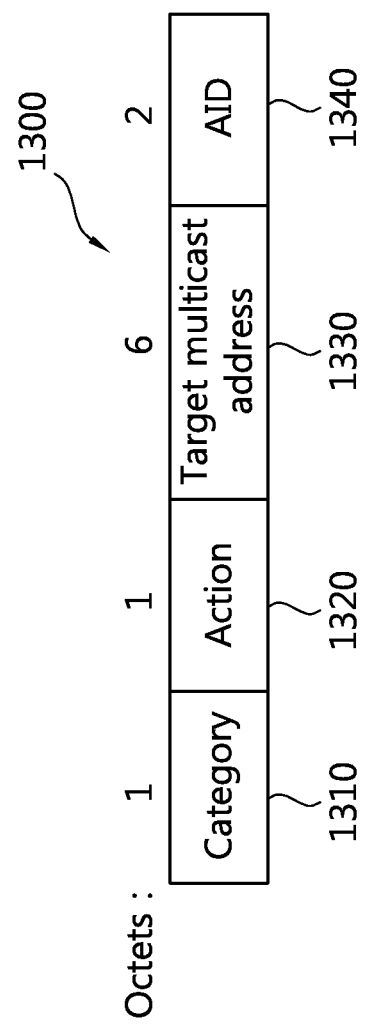
FIG. 13 is a block diagram illustrating an example of the format of a multicast AID response frame according to an embodiment of the present invention.

FIG. 13 is a block diagram illustrating an example of the format of a multicast AID response frame according to an embodiment of the present invention.

Referring to FIG. 13, the multicast AID response frame 1300 includes a category field 1310, an action field 1320, a target multicast address field 1330, and an AID field 1340.

The category field 1310 and the action field 1320 may be configured to indicate that the frame is the multicast AID response frame 1300.

The target multicast address field 1330 may be configured to indicate a target multicast address that is requested by the STA by sending the multicast AID request frame.

The AID field 1340 may be configured to indicate an AID that is mapped with the target multicast address.

When receiving the multicast AID response frame from the AP, the STA may conduct reception by filtering a multicast frame desired to receive through the delivered AID.

In case the AP may be aware of the status of the STA membership in the multicast group through the Internet Group Management Protocol (IGMP), the AP may automatically respond without any query from the STA. That is, without receiving a multicast AID request frame from the STA, the AP may directly signal the STA with an AID mapped with the target multicast address. This operation is referred to as an unsolicited multicast AID response. For the unsolicited multicast AID response, the AP may signal the STAs included in the multicast group with a target multicast address and an AID value mapped thereto through transmission of the multicast AID response frame even without receiving a multicast AID request frame.

Table 7 below represents the configuration of address fields included in a multicast frame upon transmission of multicast DL/UL frames.

TABLE 7

| transmission direction | TA | RA |
|---|---|---|
| DL | BSSID | multicast AID |
| UL | multicast AID | BSSID |

Additionally, it is also suggested herein to include partial AID (PAID)-related information in the SIG field in the PPDU format for 1 MHz transmission as shown in FIG. 8. For this, the SIG field may include a partial AID field, and the partial AID field may contain partial AID information of a receiving STA like partial AID information included in the VHT-SIG-A field of the PPDU suggested in the VHT WLAN system. Meanwhile, in case the recipient's partial AID information is included in the partial AID field of the SIG field, in the case of UL transmission, information generated based on the AP's BSSID may be contained in the partial AID field. As an example, the partial AID field may contain a partial sequence of the bit sequence constituting the BSSID. In the case of DL transmission, the STA's partial AID may be included in the partial AID field.

In order to allow the address fields such as the TA and RA of the MAC header to represent the STA's AID under the environment where the PPDU thusly configured is used, a value of the partial AID field of the SIG field may be utilized. Using this, the address field of the MAC header may be implemented as a partial sequence of the bit sequence constituting the STA's AID. The partial sequence may be configured as the remaining partial AID that is a remainder except the partial AID bit sequence configured in the partial AID field of the SIG field in the whole bit sequence of the STA's AID. For this, if the length of the STA's partial AID included in the SIG field of the PPDU is 5 bits or more, the length of the address field may be sufficient with 1 octet so that the STA's remaining partial AID may be included in the address field of the MAC header. In case the address field is configured thus, each address field may be configured as shown in Table 8.

TABLE 8

| transmission direction | TA | RA |
| --- | --- | --- |
| DL | BSSID | STA's remaining partial AID |
| UL | STA's remaining partial AID | BSSID |

Figure 14:
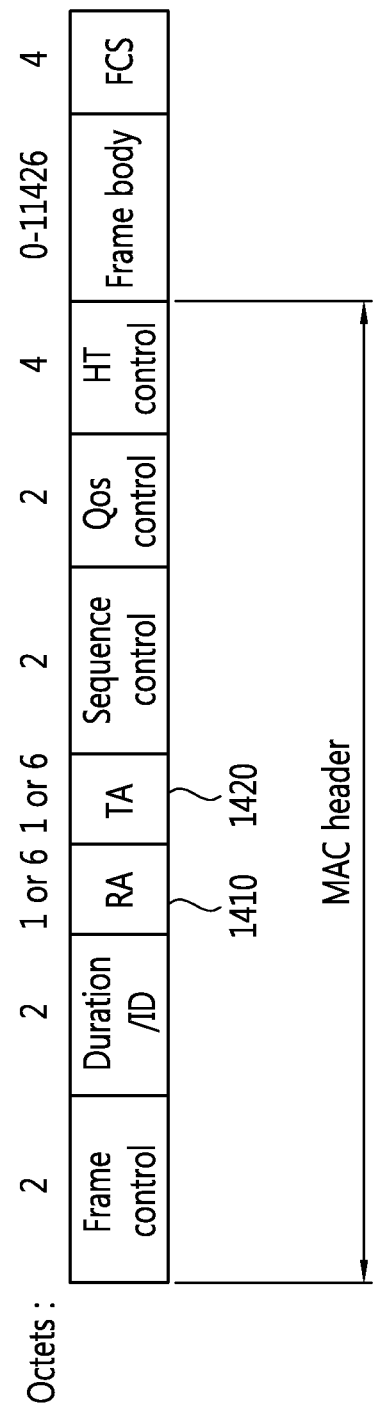
FIG. 14 is a block diagram illustrating an example MAC frame format according to an embodiment of the present invention.

In case the TA field and the RA field configured as shown in Table 8 are utilized, the MAC frame format as shown in FIG. 14 may be offered.

FIG. 14 is a block diagram illustrating an example MAC frame format according to an embodiment of the present invention.

Referring to FIG. 14, the MAC header of the MAC frame 1400 includes an RA field 1410 and a TA field 1420 as address fields. The RA field 1410 and the TA field 1420 may be configured to have a length of 1 or 6 octets. In case the RA field 1410 and the TA field 1420 are configured in a BSSID, the length of each field is set as six octets, and when configured as the STA's remaining partial AID, the length may be set as 1 octet.

In order to provide the above-described MAC header compression scheme, it needs to be configured to indicate the partial AID of a transmitting STA or receiving STA regardless of whether the partial AID field of the SIG field is one obtained by performing UL transmission or DL transmission on the PPDU. For this, the partial AID field included in the SIG field of the PPDU for 1 MHz transmission of the format suggested in FIG. 8 is configured to indicate the STA's partial AID irrespective of whether the PPDU is DL transmitted or UL transmitted. Further, a UL/DL field indicating whether the PPDU is UL transmitted or DL transmitted may be added to the SIG field. The UL/DL field may be implemented as one bit.

Figure 15:
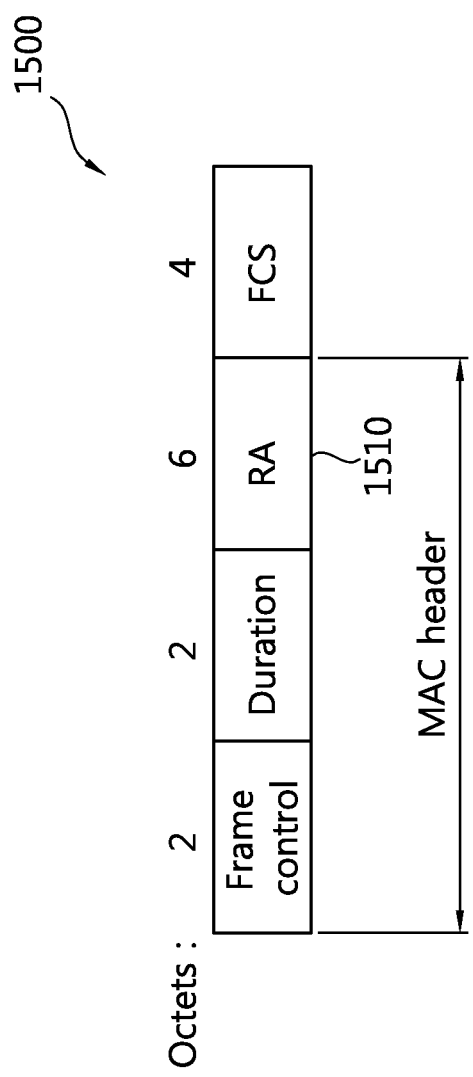
FIG. 15 is a block diagram illustrating the format of an acknowledgement (ACK) frame according to an embodiment of the present invention.

FIG. 15 is a block diagram illustrating the format of an acknowledgement (ACK) frame according to an embodiment of the present invention.

Referring to FIG. 15, the ACK frame 1500 includes, as its address field, an RA field 1510 only. The configuration of the RA field 1510 may be implemented as shown in Table 9 below.

TABLE 9

| Transmission direction | RA |
| --- | --- |
| DL | STA AID (remaining AID) |
| UL | BSSID |

According to Table 9, since the RA field 1510 may include a BSSID, the length of the RA field 1510 may be implemented to be six octets.

By the above-described method of transmitting and receiving frames based on an MAC header compression scheme, the length of the address field included in the MAC header of the frequency sent by the AP and/or STA may be substantially reduced. That is, in the case where the receiving STA's MAC address is used, the RA field or TA field of the MAC header is set to be six octets long. However, in case the receiving STA's remaining partial AID is to be used, the RA field or TA field of the MAC header is enough as being one octet long. Accordingly, the length of a frame to be sent may be decreased.

By the frame transmission and reception method implemented thus, in the DL transmission scheme, the receiving STA may verify the AID for identifying the STA receiving the PPDU through the remaining partial AID indicated by the RA field of the frame included in the PPDU's data field and partial AID indicated by the partial AID field included in the SIG field of the PPDU. Accordingly, it can judge whether the frame is the one for itself or not. More specifically, the STA may primarily determine whether the STA is a target STA that is supposed to receive the PPDU through the partial AID field in the SIG field. Secondarily, the STA may determine whether it is the target STA that is supposed to receive the transmitted frame through the remaining partial AID indicated by the RA field. In this case, the receiving STA may make such determination through the remaining partial AID only or through the partial AID and remaining partial AID both.

In the UL transmission scheme, the receiving AP may also verify which STA has sent the frame the AP receives through the remaining partial AID of the TA field and partial AID of the SIG field as above.

Additionally, the present invention suggests defining an AID in the AP without using a BSSID for the AP's address and using the AID defined as the AP's address. For such purpose, an AID that may be used only by APs may be specified. The AID, available by the APs only, may be specified as shown in FIG. 16.

Figure 16:
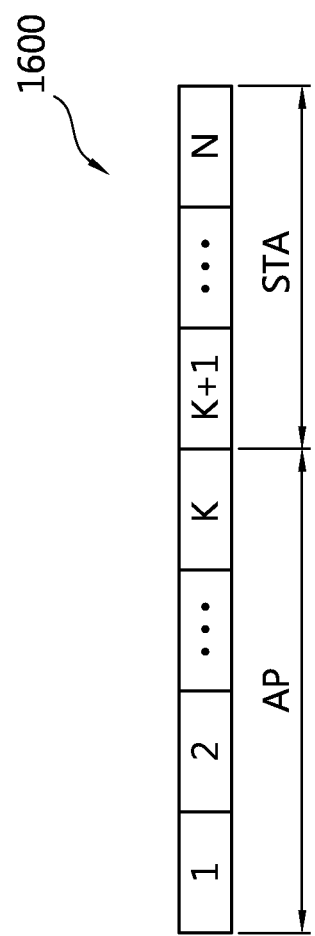
FIG. 16 is a view illustrating an example AID implementation for an AP according to an embodiment of the present invention.

FIG. 16 is a view illustrating an example AID implementation for an AP according to an embodiment of the present invention.

Referring to FIG. 16, assuming the number of all the AIDs 1600 is N, K (1 to K) AIDs may be scheduled to be available only for AP(s). The remaining N−K (K+1 to N) AIDs may be scheduled to be assigned to STA(s).

Figure 17:
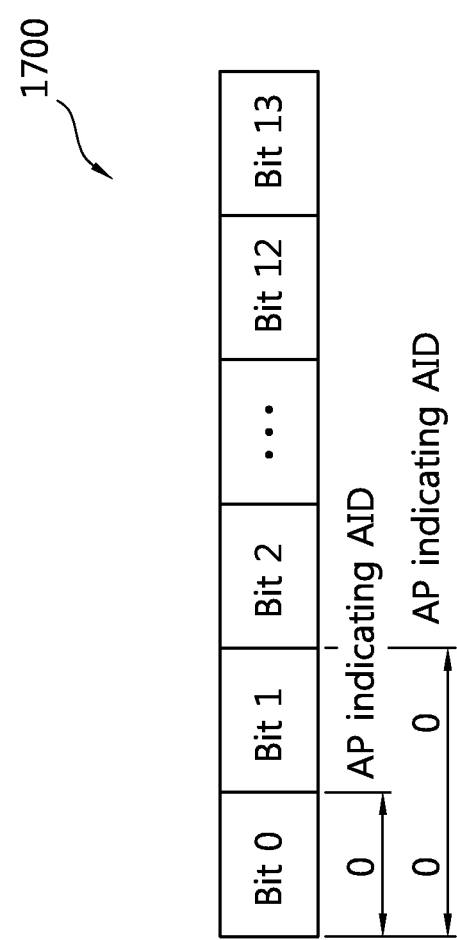
FIG. 17 is a view illustrating another example AID implementation for an AP according to an embodiment of the present invention.

FIG. 17 is a view illustrating another example AID implementation for an AP according to an embodiment of the present invention.

Referring to FIG. 17, some bits in a 14-bit AID 1700 may be configured to indicate that the AID is for the AP. For example, when the AID shown in FIG. 17 is provided, if bit 0 is 0, the AID may be implemented to indicate that the AID is for the AP. Or, if bit 0 is 0 and bit 1 is 0, the AID may be implemented to indicate that the AID is for the AP.

The AP may provide AID-related information for the AP to the STA while simultaneously assigning an AID to the STA during an association procedure between the AP and the STA. For this, the AP may send the STA's AID and AP's AID in an association response frame and re-association response frame. Further, the AP's AID may be signaled to the STA, sent in a beacon frame and/or probe response frame.

In case an AID for the AP is defined as above, the TA field and the RA field included in the MAC header according to the MAC header compression scheme may be implemented as shown in Table 10 below.

TABLE 10

| transmission direction | TA | RA |
| --- | --- | --- |
| DL | AP AID | STA AID |
| UL | STA AID | AP AID |

In describing an embodiment above, it has been mentioned that an AID field may be included in the SIG field of the PPDU for 1 MHz transmission of the format shown in FIG. 8. In case the PPDU is DL transmitted and UL transmitted, the partial AID field has been configured to indicate the STA's partial AID. However, in case an AID for the AP is defined, the partial AID field included in the PPDU's SIG field is configured with a partial AID to allow for identification of a recipient, and thus, its value may be different depending on UL transmission or DL transmission. In other words, in case the PPDU is UL transmitted, the partial AID field included in the SIG field may be configured to include the AP's partial AID that is a partial sequence of the AID assigned to the AP. In case the PPDU is DL transmitted, the AID field included in the SIG field may be configured to include the STA's partial AID.

In order for the MAC header's RA field to indicate the AID of the receiving STA and/or receiving AP under the environment where the PPDU configured thus is in use, the value of the SIG field's partial AID field may be utilized. Using this, the RA field of the MAC header in the instant invention may be implemented as a partial sequence of the bit sequence constituting the AID of the receiving STA and/or receiving AP. The partial sequence may be set as the remaining partial AID that is a remaining bit sequence except the partial AID bit sequence configured in the partial AID field of the SIG field in the whole bit sequence of the AID of the receiving STA and/or receiving AP. In case the length of the AID of the receiving STA and/or receiving AP is 14 bits, the first six bits (bit 0 to bit 5) may be set as the partial AID of the receiving STA and/or receiving AP, included in the partial AID field of the SIG field, and the remaining eight bits (bit 6 to bit 13) may be set as the remaining partial AID of the receiving STA and/or receiving AP included in the RA field of the MAC header. In case the MAC header is implemented thus, the TA field may be two octets long and the RA field may be one octet long. The MAC header's address fields according to the suggested MAC header compression scheme may be realized as shown in Table 11 below.

TABLE 11

| transmission direction | TA | RA |
| --- | --- | --- |
| DL | AP AID | STA remaining partial AID |
| UL | STA AID | AP remaining partial AID |

Figure 18:
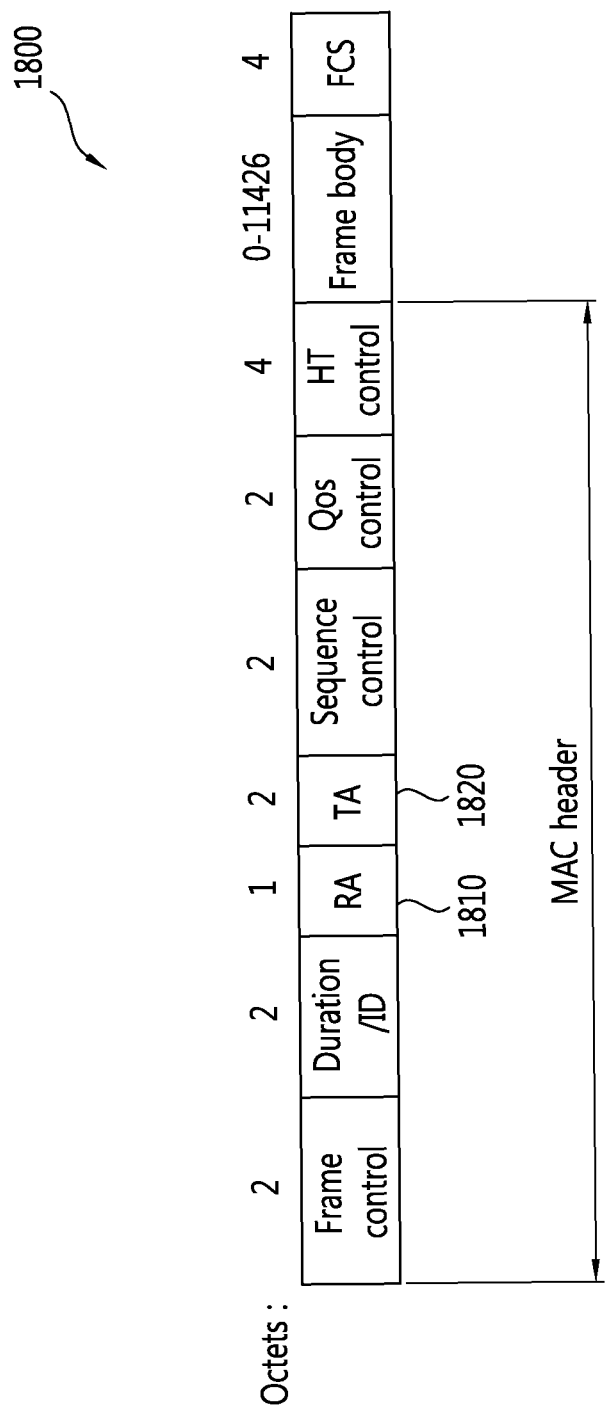
FIG. 18 is a block diagram illustrating an example MAC frame format according to an embodiment of the present invention.

In case the TA field and the RA field configured as shown in Table 11 above are utilized, the MAC frame format shown in FIG. 18 may be provided.

FIG. 18 is a block diagram illustrating an example MAC frame format according to an embodiment of the present invention.

Referring to FIG. 18, the MAC header of the MAC frame 1800 has an RA field 1810 and a TA field 1820 as its address fields. The RA field 1810 includes the remaining partial AID of the STA and/or AP, and thus, the length of the RA field 1810 may be implemented to be one octet. In contrast, since the TA field 1820 includes the AID of the STA and/or AP, the length of the TA field 1820 may be implemented to be two octets.

Figure 19:
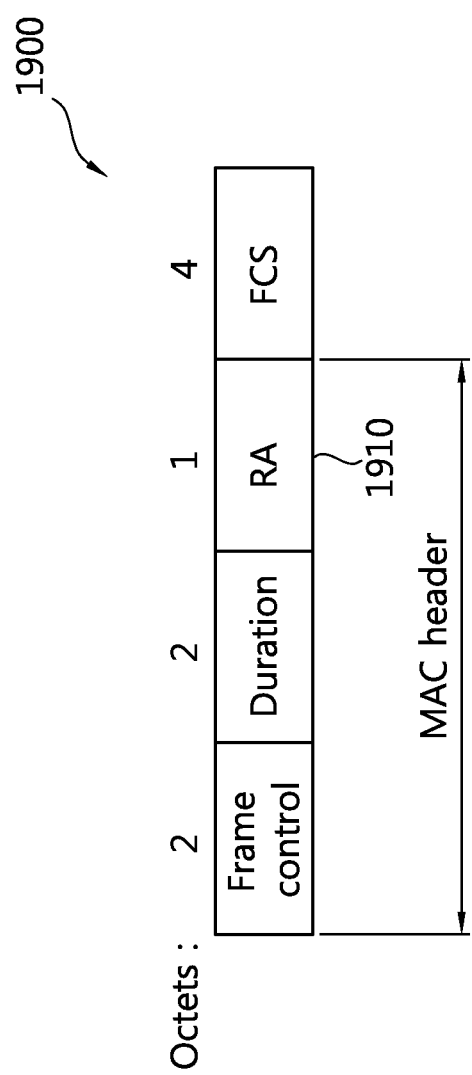
FIG. 19 is a block diagram illustrating an ACK frame format according to an embodiment of the present invention.

FIG. 19 is a block diagram illustrating an ACK frame format according to an embodiment of the present invention.

Referring to FIG. 19, the ACK frame 1900 includes as its address field an RA field 1910 only. The configuration of the RA field 1510 may be implemented as shown in Table 12 below.

TABLE 12

| transmission direction | RA |
| --- | --- |
| DL | STA AID (remaining partial AID) |
| UL | AP AID (remaining partial AID) |

According to Table 12, since the RA field 1910 may include the AID of the STA and/or AP, the length of the RA field 1910 may be implemented to be two octets. However, in case the RA field 1910 is limited as including the remaining partial AID of the STA and/or AP, the length of the RA field 1910 may be implemented to be one octet.

By the frame transmission and reception method implemented thus, in the DL transmission scheme, the receiving STA may verify the AID for identifying the STA receiving the PPDU through the remaining partial AID indicated by the RA field of the frame included in the PPDU's data field and partial AID indicated by the partial AID field included in the SIG field of the PPDU. Accordingly, it can judge whether the frame is the one for itself or not. More specifically, the STA may primarily determine whether the STA is a target STA that is supposed to receive the PPDU through the partial AID field in the SIG field. Secondarily, the STA may determine whether it is the target STA that is supposed to receive the transmitted frame through the remaining partial AID indicated by the RA field. In this case, the receiving STA may make such determination through the remaining partial AID only or through the partial AID and remaining partial AID both.

In the UL transmission scheme, the receiving AP may also verify which STA has sent the frame the AP receives through the remaining partial AID of the TA field and partial AID of the SIG field as above.

According to the above-described frame transmission and reception method, since the RA field and TA field, the frame's address fields, include a specific length of a remaining partial AID, its length may be reduced as compared with the existing one which contains the transmitter and recipient's MAC address and/or AID.

According to the MAC header compression scheme described above in connection with the drawings, the length of an MAC header, which is added to a data bit sequence in order for the AP and/or STA to substantially send data, may be seen to be considerably reduced as compared with the existing ones. Taking into account the fact that the frame body is the part in which data is substantially sent and the MAC header is a part related to control information for interpreting data that is transmitted and received in the frame body, the reduction in the length of the MAC header may mean a decrease in importance of the MAC header that is required for processing a specific length of unit data. This may lead to a reduction in the length of a frame that is exchanged between the AP and the STA for data processing, as well as an increase in the amount of data that may be treated for the same time as compared with the existing technique. When such method applies, the reduction in data throughput that comes due to the nature of the physical layer in the next-generation WLAN system operated based on a sub 1 GHz may be compensated, so that the overall throughput of the WLAN system may be enhanced.

Figure 20:
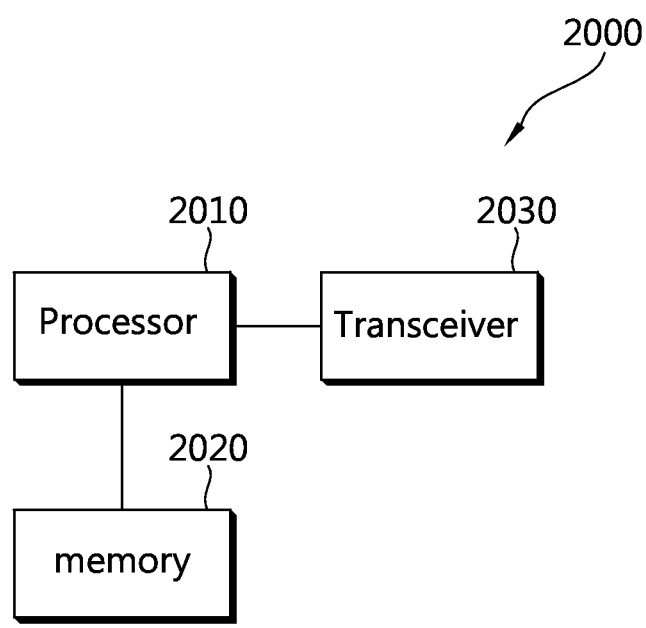
FIG. 20 is a block diagram illustrating a wireless device where an embodiment of the present invention may be implemented.

FIG. 20 is a block diagram illustrating a wireless device where an embodiment of the present invention may be implemented.

Referring to FIG. 20, the wireless device 2000 includes a processor 2010, a memory 2020, and a transceiver 2030. The transceiver 2030 transmits and/or receives radio signals and implements the IEEE 802.11 physical layer. The processor 2010 may be configured to support an MAC header compression scheme as suggested herein. The processor 2010 may be implemented to generate a frame having a suggested format for a frame transmission and reception method according to an embodiment of the present invention. The processor 2010 may be configured to implement the embodiments described above in connection with FIGS. 7 to 19.

The processor 2010 and/or transceiver 2030 may include an ASIC (Application-Specific Integrated Circuit), other chipset, a logic circuit, and/or a data processing device. When an embodiment is implemented in software, the above-described scheme may be embodied in modules (processes or operations) for performing the functions. The modules may be stored in the memory 2020 and executed by the processor 2010. The memory 2002 may be included in the processor 2010 or may be separately positioned outside the processor 2010 and may be operatively coupled with the processor 2010 via various known means.

Although in the above example system the methods are described in flowcharts having a series of steps or blocks, the present invention is not limited to the order of the steps, and some steps may be performed in a different order or simultaneously with other steps. Further, it will be understood by one of ordinary skill in the art that the steps do not exclude each other and that other steps may be added to the flowcharts or some of the steps may be omitted from the flowcharts, without affecting the scope of the present invention.

What is claimed is:

1. A method for transmitting, by an access point (AP), a frame in a wireless local area network system, the method comprising:
   receiving, from a station (STA) requesting a group Association Identifier (AID), an AID request frame;
   transmitting, to the STA, an AID response frame as a response to the AID request frame;
   generating a Medium Access Control (MAC) frame including an indication field, a first address field, and a second address field;
   generating a Physical layer convergence procedure Protocol Data Unit (PPDU) including a signal field and the MAC frame; and
   transmitting the PPDU to the STA,
   wherein the AID request frame includes group address information associated with a STA group that includes the STA,
   wherein the AID response frame includes the group AID corresponding to the group address information, and
   wherein if the indication field indicates a downlink transmission of the MAC frame, the first address field includes the group AID and the second address field includes a MAC address of the AP.

2. The method of claim 1,
   wherein if the indication field indicates the downlink transmission of the MAC frame,
   a length of the first address field is 2 octets, and
   a length of the second address field is 6 octets.

3. The method of claim 1,
   wherein the signal field includes a UL/DL indication bit,
   wherein the UL/DL indication bit indicates whether the PPDU is transmitted by an uplink transmission or a downlink transmission.

4. The method of claim 1,
   wherein the access point and the station are operating on a sub 1 GHz frequency band.

5. An access point (AP) for transmitting frames in a wireless local area network system, the AP comprising:
   a transceiver that transmits and receives a radio signal; and
   a processor, operatively coupled to the transceiver, that:
   controls the RF unit to receive, from a station (STA) requesting a group Association Identifier (AID), an AID request frame,
   controls the RF unit to transmit, to the STA, an AID response frame as a response to the AID request frame,
   generates a Medium Access Control (MAC) frame including an indication field, a first address field, and a second address field,
   generates a Physical layer convergence procedure Protocol Data Unit (PPDU) including a signal field and the MAC frame, and
   controls the RF unit to transmit the PPDU to the STA,
   wherein the AID request frame includes group address information associated with a STA group that includes the STA,
   wherein the AID response frame includes the group AID corresponding to the group address information, and
   wherein if the indication field indicates a downlink transmission of the MAC frame, the first address field includes the group AID and the second address field includes a MAC address of the AP.

6. The AP of claim 5,
   wherein if the indication field indicates the downlink transmission of the MAC frame,
   a length of the first address field is 2 octets, and
   a length of the second address field is 6 octets.

7. The AP of claim 5,
   wherein the signal field includes a UL/DL indication bit,
   wherein the UL/DL indication bit indicates whether the PPDU is transmitted by an uplink transmission or a downlink transmission.

8. The AP of claim 5
   wherein the access point and the station are operating on a sub 1 GHz frequency band.

* * * * *